(12) United States Patent
Hunaidi et al.

(10) Patent No.: US 7,810,378 B2
(45) Date of Patent: Oct. 12, 2010

(54) MONITORING OF LEAKAGE IN WASTEWATER FORCE MAINS AND OTHER PIPES CARRYING FLUID UNDER PRESSURE

(75) Inventors: Osama Hunaidi, Ottawa (CA); Alex Wang, Orleans (CA)

(73) Assignee: National Research Council of Canada, Ottawa, Ontario (CA)

( * ) Notice: Subject to any disclaimer, the term of this patent is extended or adjusted under 35 U.S.C. 154(b) by 586 days.

(21) Appl. No.: 11/766,288

(22) Filed: Jun. 21, 2007

(65) Prior Publication Data

US 2008/0314122 A1 Dec. 25, 2008

(51) Int. Cl.
*G01M 3/24* (2006.01)
(52) U.S. Cl. ...................... 73/40.5 A; 73/49.1
(58) Field of Classification Search ...................... 73/592
See application file for complete search history.

(56) References Cited

U.S. PATENT DOCUMENTS

| | | | |
|---|---|---|---|
| 3,673,856 A | 7/1972 | Panigati | |
| 4,462,249 A | 7/1984 | Adams | |
| 5,052,215 A | 10/1991 | Lewis | |
| 5,319,956 A | 6/1994 | Bogle et al. | |
| 5,461,906 A * | 10/1995 | Bogle et al. | 73/49.2 |
| 6,453,247 B1 | 9/2002 | Hunaidi | |
| 6,561,032 B1 | 5/2003 | Hunaidi | |

| | | |
|---|---|---|
| 2006/0283251 A1 | 12/2006 | Hunaidi |

FOREIGN PATENT DOCUMENTS

| | | | |
|---|---|---|---|
| DE | 4211038 | | 10/1993 |
| EP | 1077370 | | 2/2001 |
| FR | 2439990 | A1 | 5/1980 |
| GB | 2250820 | | 6/1992 |
| GB | 2269900 | | 2/1994 |
| GB | 2367362 | A * | 4/2002 |
| GB | 2421311 | A * | 6/2006 |
| JP | 59170739 | | 9/1984 |
| JP | 60111132 | | 6/1985 |

* cited by examiner

*Primary Examiner*—Hezron Williams
*Assistant Examiner*—Mark Shabman
(74) *Attorney, Agent, or Firm*—Marks & Clerk; Richard J. Mitchell

(57) ABSTRACT

A method of detecting leakage in a force main involves placing at least two spaced sensors on the force main. Liquid is pumped through the pipe by means of a pump. The pump is shut down for an interval of time, and during the period following pump shutdown while negative pressure is present in the pipe, signals are generated at the sensors due to noise or vibration resulting from fluid being drawn into the pipe. The position of a leak in the pipe is determined by correlating the leak noise signals generated while the pipe is under negative pressure. Alternatively, the invention can be applied to a pressurized pipe, in which case conditions of negative pressure can be deliberatively created for a period to draw in fluid from the outside.

25 Claims, 33 Drawing Sheets

TEST 1: HYDROPHONES AT 0 AND 300m LEAK 2 TURNS OPEN PUMP ON 10psi PRESSURE

CORRELATION RESULT:
LEAK POSITION FROM BLUE STATION:   NOT DETECTABLE
LEAK POSITION FROM WHITE STATION:  NOT DETECTABLE
TIME DELAY(S):                     NOT DETECTABLE

INPUT DATA
PIPE TYPE:        PVC
PIPE DIAMETER:    450 mm
PIPE LENGTH:      284 METERS
WAVE VELOCITY:    440 m/s

TEST 4: GEOPHONES AT 150 AND 250m LEAK 2 TURNS OPEN PUMP OFF (AIR DRAWN IN)

CORRELATION RESULT:
LEAK POSITION FROM BLUE STATION:    45 METERS
LEAK POSITION FROM WHITE STATION:   47.5 METERS
TIME DELAY(S):    0.0059

INPUT DATA
PIPE TYPE:    PVC
PIPE DIAMETER:    450 mm
PIPE LENGTH:    92.5 METERS
WAVE VELOCITY:    440 m/s

TEST 7: GEOPHONES AT 250 AND 300 m LEAK 5 TURNS OPEN PUMP OFF (AIR DRAWN IN)

CORRELATION RESULT:

ACOUSTIC VELOCITY(M/S)　　　　　　　　　377.2
TIME DELAY(S):　　　　　　　　　　　　　0.1337

INPUT DATA

PIPE TYPE:　　　　　　　　　PVC
PIPE DIAMETER:　　　　　　　450 mm
PIPE LENGTH:　　　　　　　　50.4 METERS

TEST 29: GEOPHONES 150 AND 300m LEAK 5 TURNS OPEN PUMP OFF (AIR DRAWN IN)

CORRELATION RESULT:
LEAK POSITION FROM BLUE STATION:    45.9 METERS
LEAK POSITION FROM WHITE STATION:    97 METERS
TIME DELAY(S):    0.15002

INPUT DATA
PIPE TYPE:    PVC
PIPE DIAMETER:    450 mm
PIPE LENGTH:    142.9 METERS
WAVE VELOCITY:    340 m/s

TEST 30b: GEOPHONES 150 AND 300m LEAK 5 TURNS OPEN PUMP OFF (AIR DRAWN IN)

CORRELATION RESULT:
LEAK POSITION FROM BLUE STATION:   45.4 METERS
LEAK POSITION FROM WHITE STATION:  97.5 METERS
TIME DELAY(S):                     0.15329

INPUT DATA
PIPE TYPE:      PVC
PIPE DIAMETER:  450 mm
PIPE LENGTH:    142.9 METERS
WAVE VELOCITY:  340 m/s

TEST 32r1: GEOPHONES 150 AND 300 m LEAK 2 TURNS OPEN PUMP OFF (AIR DRAWN IN)

CORRELATION RESULT:
LEAK POSITION FROM BLUE STATION:    45.4 METERS
LEAK POSITION FROM WHITE STATION:   97.5 METERS
TIME DELAY(S):                      0.15329

INPUT DATA
PIPE TYPE:        PVC
PIPE DIAMETER:    450 mm
PIPE LENGTH:      142.9 METERS
WAVE VELOCITY:    340 m/s

TEST 20: GEOPHONES 0 AND 300 m LEAK 2 TURNS OPEN PUMP OFF (AIR DRAWN IN)

CORRELATION RESULT:
LEAK POSITION FROM BLUE STATION:   NOT DETECTABLE
LEAK POSITION FROM WHITE STATION:  NOT DETECTABLE
TIME DELAY(S):                                              NOT DETECTABLE

INPUT DATA
PIPE TYPE:            PVC
PIPE DIAMETER:        450 mm
PIPE LENGTH:          284 METERS
WAVE VELOCITY:        440 m/s

TEST 47r1: GEOPHONES 100 AND 300 m LEAK 2 TURNS OPEN PUMP OFF 2-INCH AIR INTAKE AT 0m OPEN (AIR DRAWN IN)

CORRELATION RESULT:
LEAK POSITION FROM BLUE STATION:    101.6 METERS
LEAK POSITION FROM WHITE STATION:    96.5 METERS
TIME DELAY(S):    -0.01179

INPUT DATA
PIPE TYPE:    PVC
PIPE DIAMETER:    450 mm
PIPE LENGTH:    198.1 METERS
WAVE VELOCITY:    440 m/s

TEST 48: GEOPHONES 150 AND 300 m LEAK 2
TURNS OPEN PUMP OFF 2-INCH AIR INTAKE
AT 0m OPEN (AIR DRAWN IN)

CORRELATION RESULT:
LEAK POSITION FROM BLUE STATION:     40.9 METERS
LEAK POSITION FROM WHITE STATION:    102 METERS
TIME DELAY(S):                       0.17986

INPUT DATA
PIPE TYPE:       PVC
PIPE DIAMETER:   450 mm
PIPE LENGTH:     142.9 METERS
WAVE VELOCITY:   340 m/s

TEST 50: GEOPHONES 150 AND 300 m LEAK 11 TURNS OPEN PUMP OFF (AIR DRAWN IN)

CORRELATION RESULT:
LEAK POSITION FROM BLUE STATION:   NOT DETECTABLE
LEAK POSITION FROM WHITE STATION:  NOT DETECTABLE
TIME DELAY(S):   NOT DETECTABLE

INPUT DATA
PIPE TYPE:   PVC
PIPE DIAMETER:   450 mm
PIPE LENGTH:   142.9 METERS
WAVE VELOCITY:   440 m/s

TEST 53: GEOPHONES 150 AND 300 m LEAK CLOSED PUMP ON 10psi PRESSURE

CORRELATION RESULT:
ACOUSTIC VELOCITY (m/s): 428.7
TIME DELAY(S): 0.33324

INPUT DATA
PIPE TYPE: PVC
PIPE DIAMETER: 450 mm
PIPE LENGTH: 142.9 METERS

TEST 63: GEOPHONES 150 AND 300 m LEAK 5.5 TURNS OPEN PUMP ON 10psi PRESSURE

CORRELATION RESULT:
LEAK POSITION FROM BLUE STATION:   4.6 METERS
LEAK POSITION FROM WHITE STATION:   138.3 METERS
TIME DELAY(S):   0.30367
ACOUSTIC VELOCITY (m/s):   470.6

INPUT DATA
PIPE TYPE:   PVC
PIPE DIAMETER:   450 mm
PIPE LENGTH:   142.9 METERS
WAVE VELOCITY:   440 m/s

TEST 61: GEOPHONES AT 0 AND 300m LEAK CLOSED SINCE THE DAY BEFORE PUMP ON 10psi PRESSURE

CORRELATION RESULT:
ACOUSTIC VELOCITY (m/s): 465.9
TIME DELAY(S): 0.60961

INPUT DATA
PIPE TYPE: PVC
PIPE DIAMETER: 450 mm
PIPE LENGTH: 284 METERS

TEST 60: GEOPHONES AT 150 AND 300m LEAK CLOSED SINCE THE DAY BEFORE PUMP OFF

CORRELATION RESULT:
LEAK POSITION FROM BLUE STATION: NOT DETECTABLE
LEAK POSITION FROM WHITE STATION: NOT DETECTABLE
TIME DELAY(S): NOT DETECTABLE

INPUT DATA
PIPE TYPE: PVC
PIPE DIAMETER: 450 mm
PIPE LENGTH: 142.9 METERS
WAVE VELOCITY: 440 m/s

TEST 65: GEOPHONES AT 150 AND 300m LEAK 5.5 TURNS OPEN PUMP ON 10psi PRESSURE

CORRELATION RESULT:
LEAK POSITION FROM BLUE STATION:    -5.8 METERS
LEAK POSITION FROM WHITE STATION:   148.7 METERS
TIME DELAY(S):    0.35111
ACOUSTIC VELOCITY (m/s):    407

INPUT DATA
PIPE TYPE:    PVC
PIPE DIAMETER:    450 mm
PIPE LENGTH:    142.9 METERS
WAVE VELOCITY:    440 m/s

TEST 67: GEOPHONES AT150 AND 300m LEAK 5.5 TURNS OPEN PUMP ON 10psi PRESSURE

CORRELATION RESULT:

| | |
|---|---|
| LEAK POSITION FROM BLUE STATION: | -7.1 METERS |
| LEAK POSITION FROM WHITE STATION: | 150 METERS |
| TIME DELAY(S): | 0.3571 |
| ACOUSTIC VELOCITY (m/s): | 400.2 |

INPUT DATA

| | |
|---|---|
| PIPE TYPE: | PVC |
| PIPE DIAMETER: | 450 mm |
| PIPE LENGTH: | 142.9 METERS |
| WAVE VELOCITY: | 440 m/s |

TEST 67r1: GEOPHONES AT 150 AND 300m LEAK 5.5 TURNS OPEN PUMP ON 10 psi PRESSURE

CORRELATION RESULT:
LEAK POSITION FROM BLUE STATION:    -2.6 METERS
LEAK POSITION FROM WHITE STATION:   145.5 METERS
TIME DELAY(S):   0.33669
ACOUSTIC VELOCITY(m/s):   424.4

INPUT DATA
PIPE TYPE:   PVC
PIPE DIAMETER:   450 mm
PIPE LENGTH:   142.9 METERS
WAVE VELOCITY:   440 m/s

TEST 69: GEOPHONES AT 150 AND 300m LEAK 5.5 TURNS OPEN PUMP ON 10psi PRESSURE

CORRELATION RESULT:
LEAK POSITION FROM BLUE STATION:    -2.5 METERS
LEAK POSITION FROM WHITE STATION:   145.4 METERS
TIME DELAY(S):    0.33587
ACOUSTIC VELOCITY (m/s):    425.5

INPUT DATA
PIPE TYPE:    PVC
PIPE DIAMETER:    450 mm
PIPE LENGTH:    142.9 METERS
WAVE VELOCITY:    440 m/s

TEST 72: HYDROPHONES AT 0m (-40dB) AND 300m LEAK 5.5 TURNS OPEN PUMP ON 10psi PRESSURE

CORRELATION RESULT:
LEAK POSITION FROM BLUE STATION:   -1 METERS
LEAK POSITION FROM WHITE STATION:   285 METERS
TIME DELAY(S):   0.64989
ACOUSTIC VELOCITY (m/s):   437

INPUT DATA
PIPE TYPE:   PVC
PIPE DIAMETER:   450 mm
PIPE LENGTH:   284 METERS
WAVE VELOCITY:   440 m/s

TEST 75: HYDROPHONES AT 0 AND 300m LEAK 5.5 TURNS OPEN PUMP ON 10psi PRESSURE

CORRELATION RESULT:
LEAK POSITION FROM BLUE STATION:    3.6 METERS
LEAK POSITION FROM WHITE STATION:  280.4 METERS
TIME DELAY(S):    0.62884
ACOUSTIC VELOCITY (m/s):    451.6

INPUT DATA
PIPE TYPE:    PVC
PIPE DIAMETER:    450 mm
PIPE LENGTH:    284 METERS
WAVE VELOCITY:    440 m/s

TEST 77r1: HYDROPHONES AT 0 AND 300m LEAK 2 TURNS OPEN PUMP OFF -3psi PRESSURE (WATER DRAWN IN)

CORRELATION RESULT:
LEAK POSITION FROM BLUE STATION:     165.7 METERS
LEAK POSITION FROM WHITE STATION:    118.3 METERS
TIME DELAY(S):                                            -0.10785

INPUT DATA
PIPE TYPE:                             PVC
PIPE DIAMETER:                 450 mm
PIPE LENGTH:                 284METERS
WAVE VELOCITY:               440 m/s

TEST 74: HYDROPHONES AT 0 AND 300m LEAK 5.5 TURNS OPEN PUMP OFF -2.5psi PRESSURE (WATER DRAWN IN)

CORRELATION RESULT:
LEAK POSITION FROM BLUE STATION:   160.7 METERS
LEAK POSITION FROM WHITE STATION:  123.3 METERS
TIME DELAY(S):                                              -0.0849

INPUT DATA
PIPE TYPE:          PVC
PIPE DIAMETER:      450 mm
PIPE LENGTH:        284 METERS
WAVE VELOCITY:      440 m/s

TEST 80: HYDROPHONES AT 0 AND 300m LEAK 11 TURNS OPEN PUMP OFF -2.5psi PRESSURE (WATER DRAWN IN)

CORRELATION RESULT:
LEAK POSITION FROM BLUE STATION:   160.8 METERS
LEAK POSITION FROM WHITE STATION:  123.2 METERS
TIME DELAY(S):                                            -0.08526

INPUT DATA
PIPE TYPE:           PVC
PIPE DIAMETER:       450 mm
PIPE LENGTH:         284 METERS
WAVE VELOCITY:       440 m/s

**TEST 77: HYDROPHONES AT 0 AND 300m LEAK 2
TURNS OPEN PUMP OFF -3psi PRESSURE
(WATER DRAWN IN)**

CORRELATION RESULT:
LEAK POSITION FROM BLUE STATION:     178.1 METERS
LEAK POSITION FROM WHITE STATION:    105.9 METERS
TIME DELAY(S):                                                -0.16399

INPUT DATA
PIPE TYPE:             PVC
PIPE DIAMETER:      450 mm
PIPE LENGTH:         284 METERS
WAVE VELOCITY:    440 m/s

**TEST 71: HYDROPHONES AT 0m (-40dB) AND 300m
LEAK 5.5 TURNS OPEN PUMP OFF -2.5psi PRESSURE
(WATER DRAWN IN)**

CORRELATION RESULT:
LEAK POSITION FROM BLUE STATION:  182.4 METERS
LEAK POSITION FROM WHITE STATION: 101.6 METERS
TIME DELAY(S):                              -0.18376

INPUT DATA
PIPE TYPE:           PVC
PIPE DIAMETER:       450 mm
PIPE LENGTH:         284 METERS
WAVE VELOCITY:       440 m/s

TEST 76: HYDROPHONES AT 0 AND 300m LEAK 5.5 TURNS OPEN PUMP OFF -2.5psi PRESSURE (WATER DRAWN IN)

CORRELATION RESULT:
LEAK POSITION FROM BLUE STATION:   180.7 METERS
LEAK POSITION FROM WHITE STATION:  103.3 METERS
TIME DELAY(S):                                      -0.17569

INPUT DATA
PIPE TYPE:        PVC
PIPE DIAMETER:    450 mm
PIPE LENGTH:      284 METERS
WAVE VELOCITY:    440 m/s

TEST 77: HYDROPHONES AT 0 AND 300m LEAK 2 TURNS OPEN PUMP OFF -3psi PRESSURE (WATER DRAWN IN)

CORRELATION RESULT:
LEAK POSITION FROM BLUE STATION: 178.1 METERS
LEAK POSITION FROM WHITE STATION: 105.9 METERS
TIME DELAY(S): -0.16399

INPUT DATA
PIPE TYPE: PVC
PIPE DIAMETER: 450 mm
PIPE LENGTH: 284 METERS
WAVE VELOCITY: 440 m/s

TEST 77r1: HYDROPHONES AT 0 AND 300m LEAK 2 TURNS OPEN PUMP OFF -3psi PRESSURE (WATER DRAWN IN)

CORRELATION RESULT:
LEAK POSITION FROM BLUE STATION:    165.7 METERS
LEAK POSITION FROM WHITE STATION:   118.3 METERS
TIME DELAY(S):                                                  -0.10785

INPUT DATA
PIPE TYPE:           PVC
PIPE DIAMETER:   450 mm
PIPE LENGTH:      284 METERS
WAVE VELOCITY:  440 m/s

TEST 75: HYDROPHONES AT 0 AND 300m LEAK 5.5 TURNS OPEN PUMP ON 10psi PRESSURE

CORRELATION RESULT:
LEAK POSITION FROM BLUE STATION:   3.6 METERS
LEAK POSITION FROM WHITE STATION:  280.4 METERS
TIME DELAY(S):   0.62884
ACOUSTIC VELOCITY (m/s):   451.6

INPUT DATA
PIPE TYPE:   PVC
PIPE DIAMETER:   450 mm
PIPE LENGTH:   284 METERS
WAVE VELOCITY:   440 m/s

TEST 75r1: HYDROPHONES AT 0 AND 300m LEAK 5.5 TURNS OPEN PUMP ON 10psi PRESSURE

CORRELATION RESULT:
LEAK POSITION FROM BLUE STATION:    6.5 METERS
LEAK POSITION FROM WHITE STATION:   277.5 METERS
TIME DELAY(S):                      0.61596
ACOUSTIC VELOCITY (m/s):            461.1

INPUT DATA
PIPE TYPE:       PVC
PIPE DIAMETER:   450 mm
PIPE LENGTH:     284 METERS
WAVE VELOCITY:   440 m/s

TEST 75r2: HYDROPHONES AT 0 AND 300m LEAK 5.5 TURNS OPEN PUMP ON 10psi PRESSURE

CORRELATION RESULT:
LEAK POSITION FROM BLUE STATION:     7 METERS
LEAK POSITION FROM WHITE STATION:     277 METERS
TIME DELAY(S):     0.61324
ACOUSTIC VELOCITY (m/s):     463.1

INPUT DATA
PIPE TYPE:     PVC
PIPE DIAMETER:     450 mm
PIPE LENGTH:     284 METERS
WAVE VELOCITY:     440 m/s

MONITORING OF LEAKAGE IN WASTEWATER FORCE MAINS AND OTHER PIPES CARRYING FLUID UNDER PRESSURE

FIELD OF THE INVENTION

This invention relates to the field of water leakage detection, and in particular to a method and apparatus for monitoring leakage in pressurized fluid-filled pipes, such as wastewater force mains and pressurized water distribution systems.

BACKGROUND OF THE INVENTION

Wastewater collection systems are a critical part of urban infrastructure. They collect sewage from homes, businesses and industries and convey it to treatment plants before it's safely released back into the environment. These systems are complex networks of gravity sewers, holding tanks, pumping stations and pressurized pipes known as force mains. Gravity sewers are the primary means of collecting wastewater and conveying it to treatment plants. However, where excavation conditions are difficult or in flat areas or when wastewater needs to be conveyed across rivers or lakes, gravity sewers are not practical and wastewater must be pumped through force mains. Typically, in such situations the gravity sewers flow into holding tanks, from where the wastewater is pumped to gravity sewers on the other side of the river. Pumping is periodic, its duration and period depend on the rate of wastewater flow and capacity of holding tanks. Typically, the duration is between 3 to 5 minutes.

Gravity sewers and force mains deteriorate naturally with time and eventually lose their initial wastewater tightness, starting to leak. Deterioration is caused by corrosion, soil movement, poor construction standards, and in the case of force mains by repeated pressurizing and depressurizing. Leakage of wastewater is especially of concern in the case of force mains at river and lake crossings because it may go undetected for long periods of time and can have severe impact on the environment. A number of catastrophic incidents have occurred in Canada and the United States in recent years. This risk needs to be addressed and therefore there is an urgent need for reliable technologies to continuously monitor leakage in these critical pipes.

Technologies that may be applicable include acoustic leak noise correlation, mass balance, pressure analysis, and temperature monitoring using fibre-optic sensors.

Mass balance, pressure analysis, and temperature monitoring using fibre-optic sensors are costly to implement. Also, these technologies have been developed primarily for monitoring leakage in oil and gas pipelines under steady state conditions. They have not been demonstrated or evaluated for monitoring of wastewater force mains, which normally operate under transient conditions.

Acoustic leak noise correlation technology is well established for detecting and pinpointing leaks in water transmission and distribution pipes. However, like other technologies, its application to wastewater force mains had not been demonstrated in the past. It is commonly believed that the application of acoustic correlation to force mains is fraught with difficulties due to high background noise caused by nearby pumping stations, excessive signal attenuation caused by the presence of undissolved gases, and compressible solid matter; variable acoustic propagation velocity; relatively low pipe pressure; and the requirement for large sensor-to-sensor spacing.

Additionally, while leaks in pressurized water distribution systems can generally be detected using acoustic leak noise correlation technology, problems can arise when the leaks are very small since the generated noise level in this case can be very low.

SUMMARY OF THE INVENTION

In accordance with the present invention leakage in a pressurized pipe, such as a wastewater force mains, is monitored using acoustic leak noise correlation but not in the usual way, i.e., not while the pipe is under positive internal pressure. Following pump shutdown, negative internal pressure develops in force mains due to the fact that the wastewater continues to flow along the mains by inertia. It has been found unexpectedly that this negative pressure produces favourable conditions for acoustic correlation, i.e., high-enough acoustic signals created by fluid or air drawn into the pipe through the leak in the absence of high background noise from pumps.

Another application of the invention is for leak testing of newly constructed pipes. These pipes have to pass stringent static pressure tests to find small leaks. Many of the small leaks that cause pipes to fail a pressure test are very hard to locate. Currently, these small leaks cannot be detected using the "traditional method", i.e., under positive pipe pressure. The only way to currently find them is to excavate large lengths of the pipe, which is very expensive. Drawing air or water into fluid-filled pipes creates much louder noise than that created by drawing fluid out of pipes. This creates more favourable conditions for the correlation method to detect these small leaks (e.g., leak signal levels above the noise floor of sensors). Negative pressure can be induced by isolating a pipe section (e.g., closing end valves) and drawing water or air through a tapped location using a manual or powered pump.

The invention is in many ways counterintuitive. While it would be expected that one would need to pressurize the pipe in order to detect the leaking fluid (clearly fluid does not leak from the pipe when it is under zero pressure), the invention recognizes the fact that if negative pressure conditions are created in the pipe, external fluid will leak into the pipe at the same location, and the noise created by this leaking fluid can be detected and analyzed by cross correlation techniques because it gives a good signal in the absence of extraneous noise caused by pumps. In one embodiment, the invention takes advantage of the fact that negative pressure is naturally created in the pipe in the period following pump shutdown.

Thus, in accordance with a first aspect of the invention there is provided a method of detecting leakage in a pipe for carrying a pressurized fluid, comprising creating conditions of negative pressure in said pipe so that external fluid is drawn into said pipe to generate noise or vibration at a leak location; generating signals corresponding to said noise or vibration from spaced sensors located on said pipe; and analyzing said signals to determine the location of said leak.

In the case of a wastewater force mains, the negative pressure is generated during a period of pump shutdown due to the inertia effect of the water on the downstream side of the pump, which will initially tend to keep flowing after the pump has been shut off. The pump normally includes a check valve to prevent reverse flow and keep the pump primed. The time the negative pressure remains usable depends on the nature of the leak and pipe. The larger the leak the faster negative pressure is dissipated. In pilot tests undertaken to demonstrate this invention, the largest leak induced was a substantial 5 liters per second (fully open 2-inch valve). At this leak flow rate, negative pressure in the pipe held steady at ~2.5 psi (at leak location) for the whole duration of pump shutdown (5 to 10 minutes). An other parameter that is critical is maximum sensor spacing, which was shown to be at least 300 meters.

In the case of a pipe laid across a river, acoustic noise in the pipe can be monitored continuously and simultaneously at two inland points on the pipe, close to either bank of the river. Either hydrophones or vibration sensors are used to pick up acoustic noise, depending on material type, diameter and length of the pipe section to be monitored.

Hydrophones may be inserted inside pipes at existing or specially created taps. Alternatively, a hydrophone array may be inserted. Alternatively, vibration sensors may be attached to the external surface of pipes.

In the case of a water distribution system, a section of pipe can be isolated, for example, by closing appropriate valves, and negative pressure created by pumping water out of the isolated section. This embodiment provides a way of detecting very small leaks. Typically, before a water distribution system is commissioned, the system is pressurized under static conditions to detect any leaks. Leaks that typically cause pipes to fail static pressure tests are typically very small in size and therefore in most cases cannot be pinpointed using cross-correlation techniques. However, if pipe sections are isolated and a negative pressure created in accordance with the invention, ingressing air or fluid creates a substantial amount of noise which more readily lends itself to acoustic noise cross-correlation techniques.

Acoustic signals may be transmitted over wire or wirelessly in either analogue or digital form to a receiving station. Received acoustic signals are manually or automatically recorded and correlated. This can be performed using a modified version of the LeakfinderRT system, patented by NRC-IRC. The LeakfinderRT system can also be modified to automatically alarm pipeline operators when a leak is detected and provide information about its approximate location according to pre-set thresholds and criteria.

The invention overcomes the problem of high background noise of pumping stations, is capable of detecting both small and large leaks, does not require taking pipes out of service to install instrumentation, and can be easily implemented using a Windows-based software for embedded computers and readily available hardware.

In accordance with a second aspect of the invention there is provided a system for detecting leakage in a pipe carrying pressurized fluid, comprising at least two spaced sensors located on the pipe; means for periodically creating negative pressure in the pipe to draw fluid or air into the pipe at the location of a leak; and a computer programmed to determine the location of the leak by analyzing signals representing noise or vibration occurring at the location of said leak.

The sensors can be located on or inside the pipeat opposite sides of the location of the leak or at opposite ends of the pipe section to be monitored.

DETAILED DESCRIPTION OF THE PREFERRED EMBODIMENTS

Figure 1:
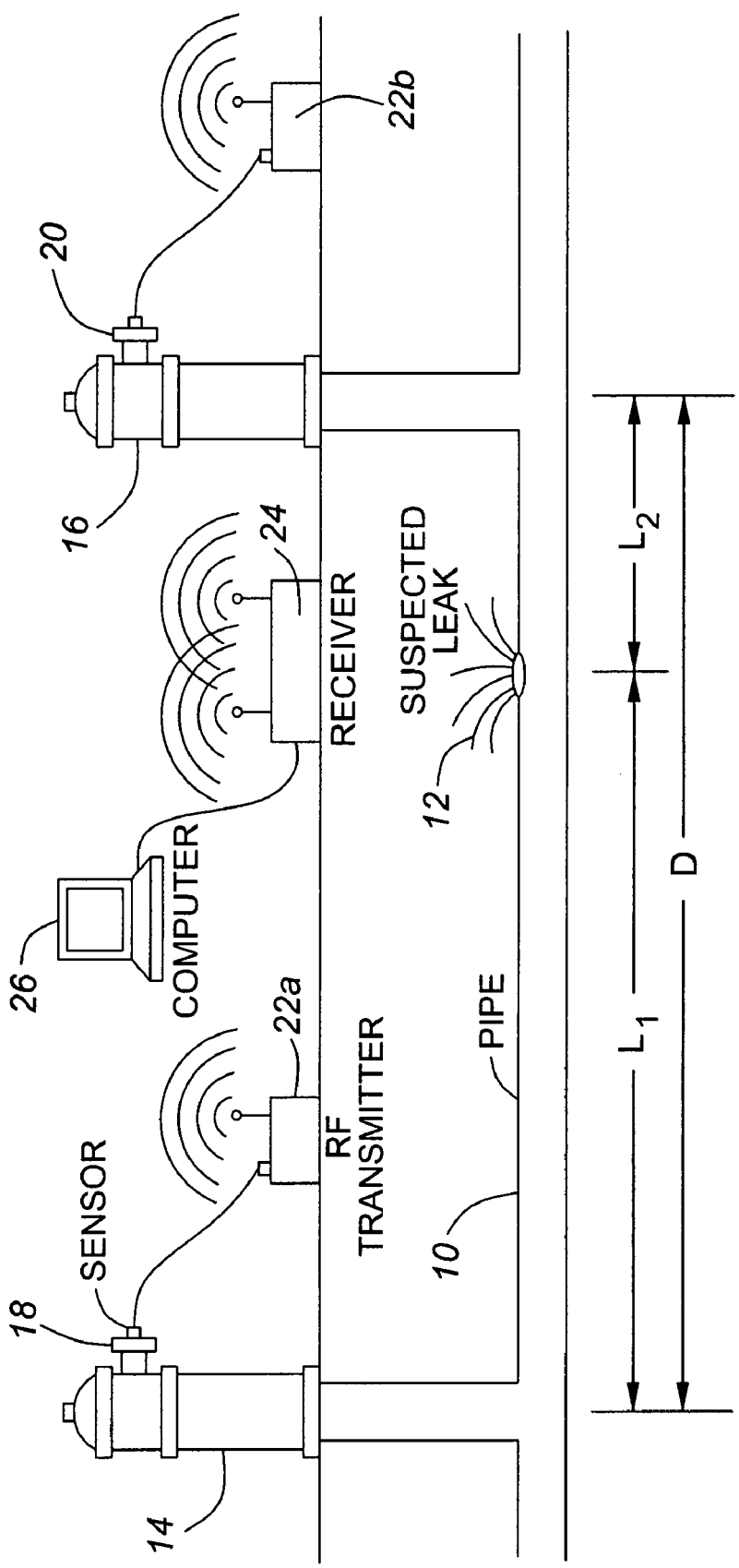
FIG. 1 is a general schematic diagram illustrating the method for locating a leak in a pipe.

In FIG. 1 a pipe 10 has developed a leak 12. A pair of hydrants 14, 16 are arranged at spaced locations. The leak 12 is located at a distance $L_1$ from hydrant 14, and distance $L_2$ from hydrant 16. The total separation of the hydrants is D.

Hydrophone sensors 18, 20 are located at respective hydrants 14, 16. These are connected to an RF transmitter 22 which communicates with a receiver 24 connected to a computer 26. The location of the leak can be determined using LeakfinderRT software running on the computer 26.

LeakfinderRT is a system that was developed by the National Research Council Canada for locating leaks in pressurized fluid-filled pipes, especially municipal water distribution and transmission pipes. In a traditional application, LeakfinderRT utilizes the cross-correlation method to locate the hissing sound created by a pressurized fluid as it leaks out of the pipe. This system is fully realized in software for personal computers (PCs) running under Microsoft Windows. It uses the PC's soundcard and other multimedia components to record and play back acoustic leak signals. It also uses the PC's processor to perform the cross-correlation operation and associated digital signal conditioning operations. Modem PCs incorporate fast processors and high-resolution soundcards and, hence, offer several advantages over existing commercial hardware implementation of the cross-correlation method. Hardware components of the Leakfinder$^{RT}$ system include leak sensors (either vibration sensors or hydrophones), wireless signal transmission system, and a PC. The software can be installed on either a notebook, desktop or embedded PC that has a soundcard with a stereo line-in port and it has a friendly menu-driven interface.

The LeakfinderRT system incorporates an enhanced correlation function. For narrow-band leak noise, this function dramatically improves the definition of correlation peaks. This is important for plastic pipes, multiple-leak situations, and in settings where leak sensors have to be closely spaced. Also, the enhanced correlation function is more effective than the traditional correlation function for small leaks and for situations of high background noise. The enhanced correlation function technique is described in U.S. Pat. No. 6,453,247, the contents of which are herein incorporated by reference.

The cross-correlation function can be directly applied to problems involving the measurement of distance (i.e., ranging problems) or the measurement of velocity—the distance can be determined given the velocity or vice versa. Similarity between sensed leak signals is essential for obtaining an accurate time delay—hence, the assumption of a non-dispersive medium, i.e., one in which the propagation velocity does not vary with frequency. If this is not the case or if the propagating phenomenon is not sufficiently broad-band, the cross-correlation function will not have a distinct peak.

Locating leaks in pressurized fluid-filled pipes is a classical application of the cross-correlation method. Two things make this possible. First, the propagation velocity of leak sounds in pressurized pipes is nearly constant over the dominant frequency range of leak sounds. Second, fluid-filled pipes transmit leak signals for long distances. Therefore, the shape of leak signals does not change significantly as they travel away from the leak, which is a prerequisite for a successful correlation.

Leak noise signals are measured at the two points that bracket the location of a suspected leak. The cross-correlation function of the two leak signals is then calculated to determine the time delay between the two signals. Time delay between the two leak signals is the result of one measurement point being closer to the leak location than the other. If the two measurement points are symmetrically positioned about the leak location, leak signals will arrive simultaneously at the two points and the time delay will be zero. On the other hand, if the leak location is exactly at the position of one of the two measurement points (or, equivalently, it is not between the two points), the time shift will be equal to the distance between the measurements points divided by the propagation velocity of leak noise in the pipe.

The correlation magnitude of two leak noise signals is the summation of their product as a function of time shift. In simple terms, the correlation value at time shift τ is computed by first shifting one of the signals by τ relative to the other signal. Then the two signals are multiplied, point-by-point, and the products are summed. The correlation function will display a peak at the time shift, which corresponds to the actual delay between the two leak noise signals (this is the time at which the two signals overlap).

The time delay $\tau_{max}$ corresponding to the peak of the cross-correlation function is determined automatically. In reference to FIG. 1, the time delay between the two leak noise signals is related to the location of the leak relative to measurement points by $$\tau_{max} = \frac{L_2 - L_1}{c} \quad (1)$$

where $L_1$ and $L_2$ are the positions of the leak relative to sensors 1 and 2, respectively, and c is the propagation velocity of the leak sound in the pipe. By substituting $L_2=D-L_1$ in the above equation, the position of the leak relative to point 1 is found as $$L_1 = \frac{D - c \cdot \tau_{max}}{2} \quad (2)$$

where D is the distance between the sensors, either measured on site or read off system maps. The propagation velocity can be specified if it was measured onsite or it can be calculated theoretically based on input for pipe material type and diameter.

If there is more than one leak between sensor positions 1 and 2, the cross-correlation function will have a peak corresponding to each leak. However, if the leaks are closely spaced, the peaks will overlap and distort the corresponding time delay. The peak width depends on the bandwidth of the leak noise; the wider the frequency bandwidth of leak signals, the narrower the cross-correlation peak. The frequency bandwidth of leaks in metal pipes is much wider than that of leaks in plastic ones. For metal pipes, it may be possible to resolve leaks that are 6 m apart; for plastic pipes it may not be possible to resolve accurately leaks that are less than 20 m apart.

Pilot Field Tests

Setup

Field tests were performed at a dry-land site in Winnipeg, Canada. The site has a 450 mm diameter 1800 meters long PVC force main that was installed in 1988 at a depth between 1.5 and 3 meters. Soil type at the site was silty clay.

Acoustic correlation tests were performed on a 300-meter long segment of the pipe (corresponding to the maximum anticipated river crossing length) starting at about 50 m from the pumping station. The location of the test pipe segment close to the pumping station, its PVC material type, large 450 mm diameter and 300-meter length were deliberately selected. These were believed to be representative of the most challenging conditions for acoustic correlation of leak signals in river-crossing force mains.

Figure 2:
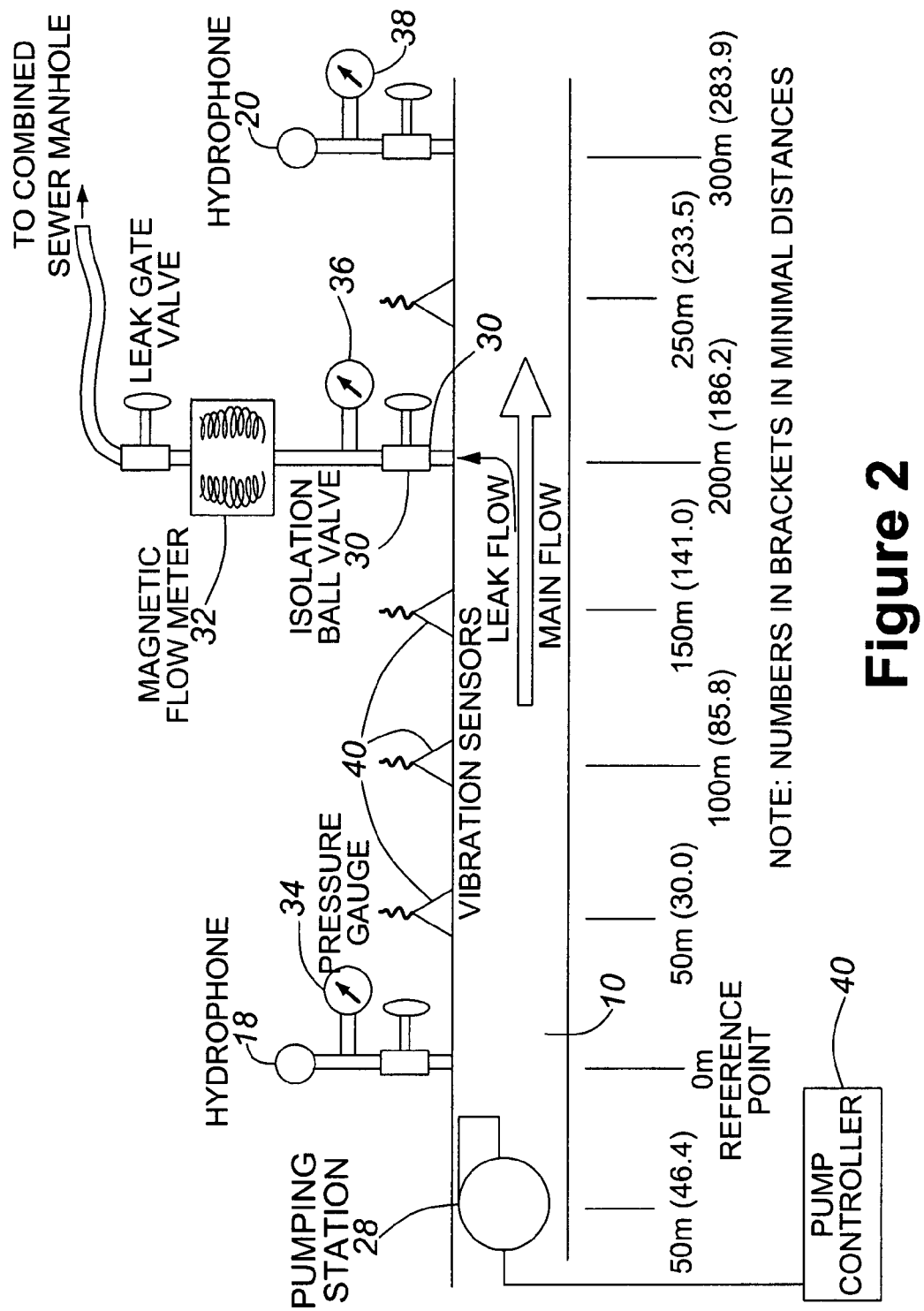
FIG. 2 is a schematic diagram of a particular experimental setup for illustrating the present invention.

The experimental layout for the tests is shown in FIG. 2, and is similar to FIG. 1. Pumping station 28 has two 8-inch pumps that operate alternately under normal flow conditions and simultaneously under high flows, e.g., during rainstorms. Weather conditions were mostly dry and clear during the tests; it rained heavily for one hour only. Pressure in the force main at approximately 250 meters from the pumping station was about 10 psi when only one pump was on and 15 psi when both pumps kicked in. The pump includes a controller 40 that periodically runs and shuts down the pump, depending on a preset level of wastewater in holding tanks.

Instrumentation and Software

Instrumentation and software used for measuring, recording and analysis of leak signals were proprietary but available commercially. Accelerometers, geophones and hydrophones made by Echologics Engineering Inc. were used to measure leak noise signals. Accelerometers were of the piezoelectric type with internal preamplifiers and had a sensitivity of 1 volt/g (where g is the unit of gravitational acceleration equal to 9.8 m/s$^2$). Geophones were of the rotating coil type with a special active electromagnetic interference shield and had a sensitivity of 1 volt/cm/second. Hydrophones were of the piezoelectric type with externally housed preamplifiers and had a sensitivity of 42 volts/bar (where bar is the unit of atmospheric pressure equal to 14.5 psi).

Accelerometers and geophones were mounted on top of the force main by magnetically attaching them to small steel plates glued to the main's surface. Hydrophones were housed in special adaptors that were fitted into 2-inch taps in the force main. Hydrophone adaptors were equipped with ⅛-inch valves to release entrapped air after attaching them to the main. For some measurements, signals from hydrophones were attenuated by electrically connecting appropriate capacitors across input terminals of its preamplifier, in parallel with the hydrophone transducer.

Leak signals picked up by sensors were fed into two 460 MHz RF wireless transmitters. A corresponding 2-channel receiver at a remote recording station picked up broadcasted signals. Transmitters contain a power supply source for sensor preamplifiers and specially designed automatic gain amplifier for conditioning of signals before broadcasting. The wireless transmission system operated in a licensed UHF frequency band and was made by Echologics Engineering Inc. Its line-of-sight range extends up to 3 km. Wireless transmitters were colour coded Blue and White and are referred to in this report as "Blue station" and "White station". The Blue station was always connected to the sensor closest to the pumping station.

Wirelessly received leak noise signals were then fed into the stereo audio line-in port of a portable PC for recording and analysis by LeakfinderRT software version 5.49. The portable computer was of the tablet type with a 1 GHz Intel Pentium M processor (Compaq model TC1100).

Test and Analysis Procedures

A simulated leak with adjustable flow rate was created in the selected 300-meter long test pipe section at approximately 250 meters away from the pumping station. The pipe was excavated and then tapped using a saddle tapping clamp with a 2-inch ball valve 30. A 2-inch magnetic flow meter 32 was attached after the ball valve to measure leak flow rate. A pressure gauge 34 was installed on the upstream side of the flow meter. A 2-inch gate valve was attached after the flow meter to adjust leak flow rate. Wastewater from the simulated leak was disposed through a rubber hose that ran from the outlet of the gate valve to a nearby combined sewer manhole.

The pipe was also excavated at six other locations at about 50-meter intervals from the location of the simulated leak to attach vibration sensors 40 to the pipe's external surface to measure its acceleration or velocity. At the two most extreme excavations, the pipe was tapped using saddle tapping clamps with 2-inch ball valves to attach hydrophones to measure sound waves in the wastewater inside the pipe. Pressure sensors 34, 38 were added to sense the pressure at the location of the hydrophones. Pressure sensor 36 senses pressure at the flow meter 32.

The gate valve of the simulated leak was initially left open continuously regardless of whether the pipe was pressurized or not but later check valves were connected. Sensors were attached to the pipe at two selected locations bracketing the simulated leak. Simultaneous recording of leak signals picked up by the two sensors started once wastewater flowed from the simulated leak. Recording was terminated when leak flow stopped. Leak signals were cross-correlated onsite in real time.

Cross-correlation tests were performed for different combinations of leak flow rate and sensor type and spacing. Leak flow rate was approximately 1, 3 or 5 liters per second achieved by opening the leak's 2-inch gate valve 2, 5.5 and 11 turns (valve was fully open at 11 turns). A leak flow rate smaller than ~1 liters per second could not be achieved, as the opening of the gate valve would quickly get blocked with dirt. A flow rate of 5 liters per second was the maximum achievable rate. Leak signals were picked up by pairs of accelerometers, geophones or hydrophones spaced at 100, 150, 200, 250, or 300 meters.

Results

Regardless of the flow rate of the simulated leak, acoustic signals measured with hydrophones at 0 and 300 m, while pipe pressure was 10 psi (at leak location) had a poor cross-correlation function and subsequently the leak could not be detected. The correlation function did not even have a peak corresponding to the out-of-bracket noise created by the pump(s) at the nearby pumping station. Pump noise picked up by the hydrophone at 0 m was extremely high and was distorted on a high-quality audio headset. It was believed that high output of the 0 m hydrophone transducer was overloading its preamplifier and the automatic gain circuit. In subsequent measurements, leak signals from the transducers of the hydrophones at 0 and 300 m were attenuated by up to 60 and 10 dB, respectively. This eliminated signal distortion but the cross-correlation function remained poor.

Figure 3:
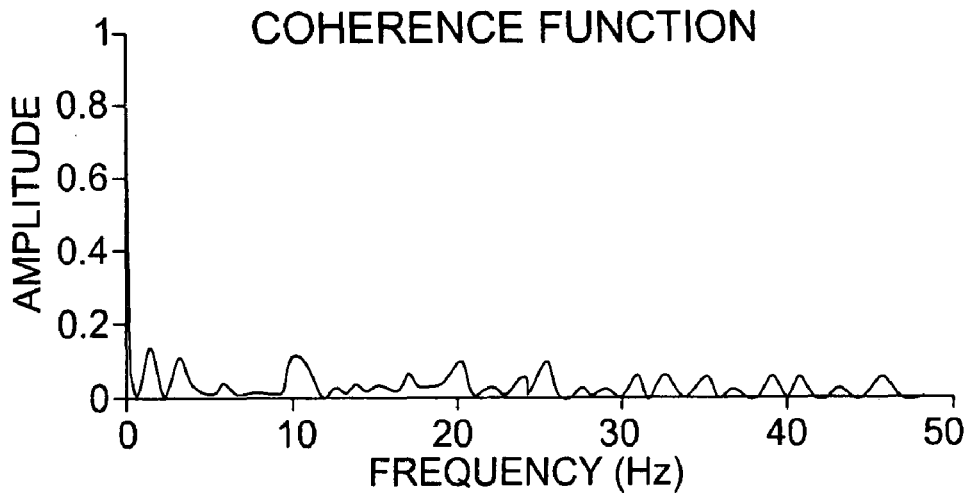
FIGS. 3 to 33 show test results for the experimental setup shown in FIG. 2.
Figure 3:
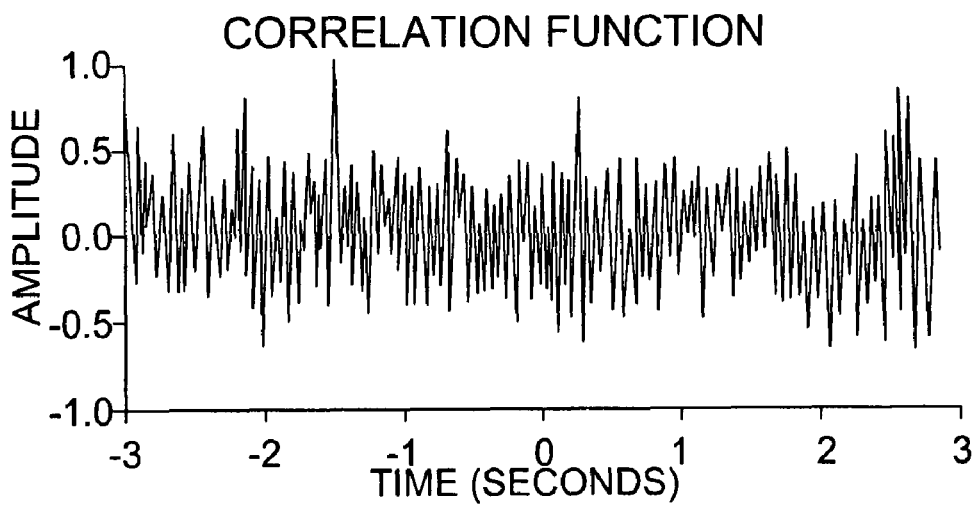

Similarly, acoustic leak signals measured with geophone pairs located at 0 and 300 m, 150 and 300 m, and 150 and 250 m also had poor cross-correlation functions and subsequently the simulated leak could not be detected. Leak signals measured using either hydrophones or geophones had low coherence function across the whole frequency range. This indicates that the measured acoustic signal pairs were incoherent, i.e., they were unrelated or not caused by the same source (see FIG. 3).

It was initially believed that the poor coherence cross-correlation of measured acoustic leak signals could be attributed to one or more of the following reasons:

Low pressure in the pipe (10 psi) leading to only weak acoustic noise from the leak.

Excessive free air in wastewater inside the pipe leading to severe attenuation of the leak noise.

Insufficient signal duration to average out interfering noise as the pipe was under pressure for ~3 minutes only at a time.

However, it was later discovered that the real reason was that the pipe segment between sensor pairs was not fully filled with wastewater at the location of one or both sensors. When pumping stopped, negative pressure developed in the pipe and air was drawn in through the simulated leak. This eventually led to the formation of an air cavity at the top of the pipe along a large pipe section between sensors. This disrupted the propagation of leak signals in the wastewater core and reduced their level below the threshold of sensors. When pumping resumed, it was for no more than 3 minutes and it appears that this was not long enough to refill the pipe section between sensors.

Figure 4:
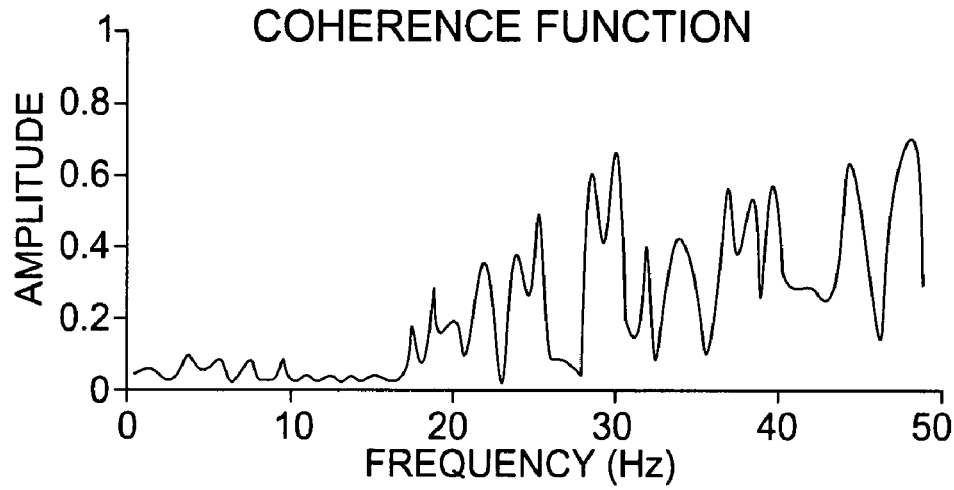
Figure 4:
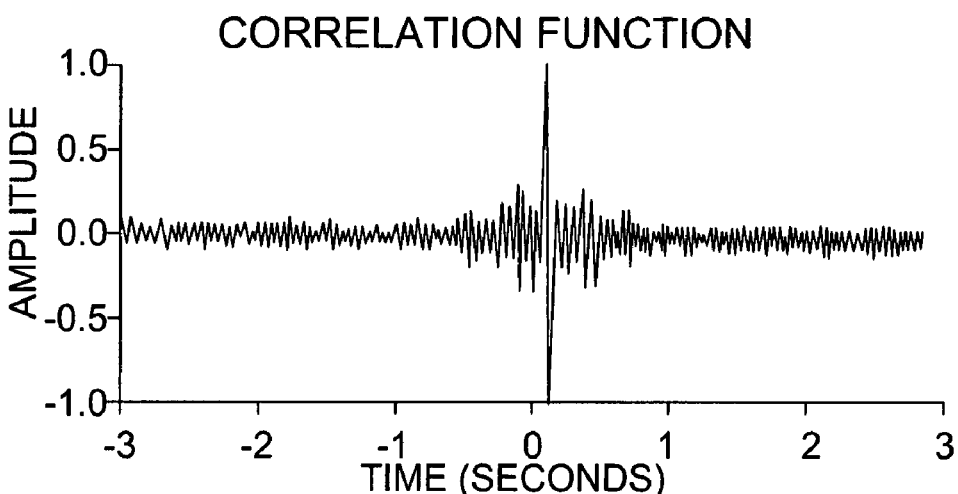
Figure 5:
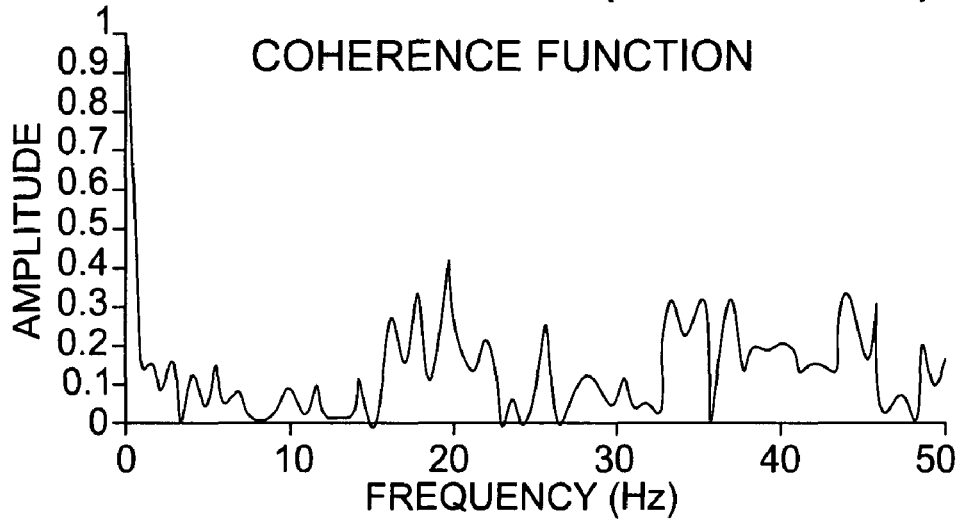
Figure 5:
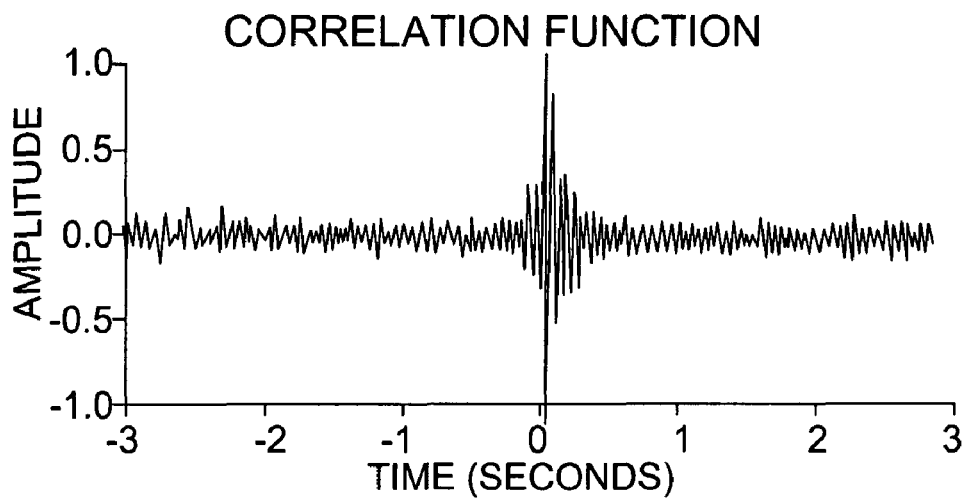

The air cavity was confirmed based on the cross-correlation function of leak signals measured with geophones at 150 and 250 m while pumping was off and air being drawn into the pipe through the leak opening. The cross-correlation function thus obtained had a definite center peak that corresponded to the actual position of the leak (see FIG. 4). Cross-correlation function of similar measurements of leak noise signals but with geophones at 250 and 300 m had a clear peak corresponding to out-of-bracket noise from air being drawn in through the leak (see FIG. 5). Acoustic velocity based on this peak was very close to the velocity of sound in air (equal to 340 m/s at a temperature of 15° C. sea level). A similar result was obtained based on leak signals measured with accelerometers. These results were taken as an indication that the sound of air being drawn into the pipe through the leak propagated through a continuous air cavity along the pipe between vibration sensors.

Figure 6:
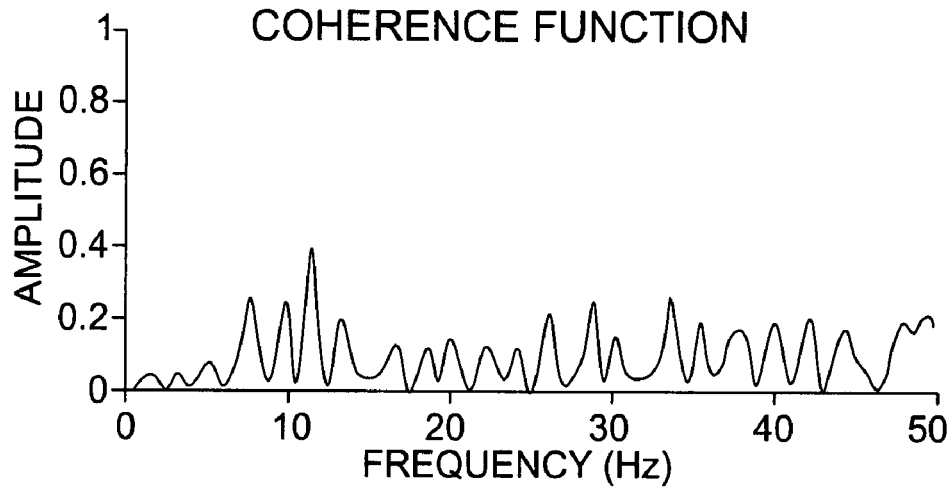
Figure 6:
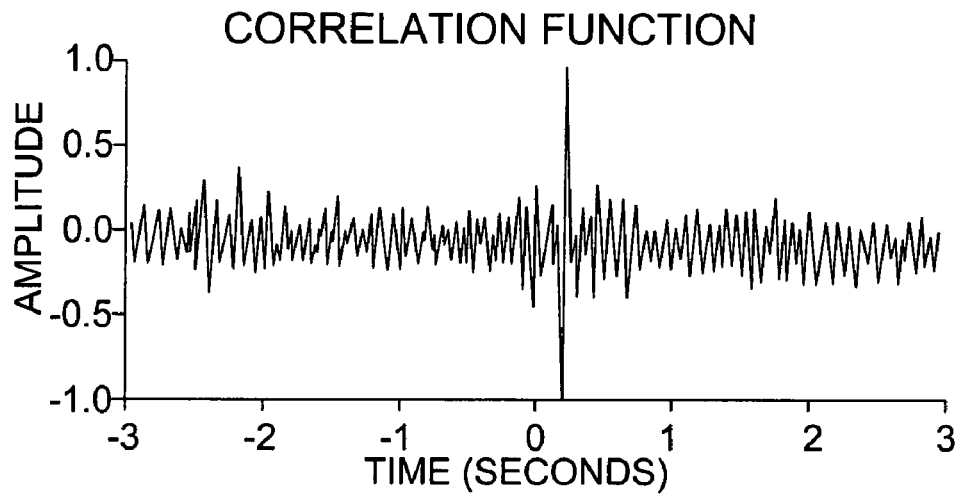
Figure 7:
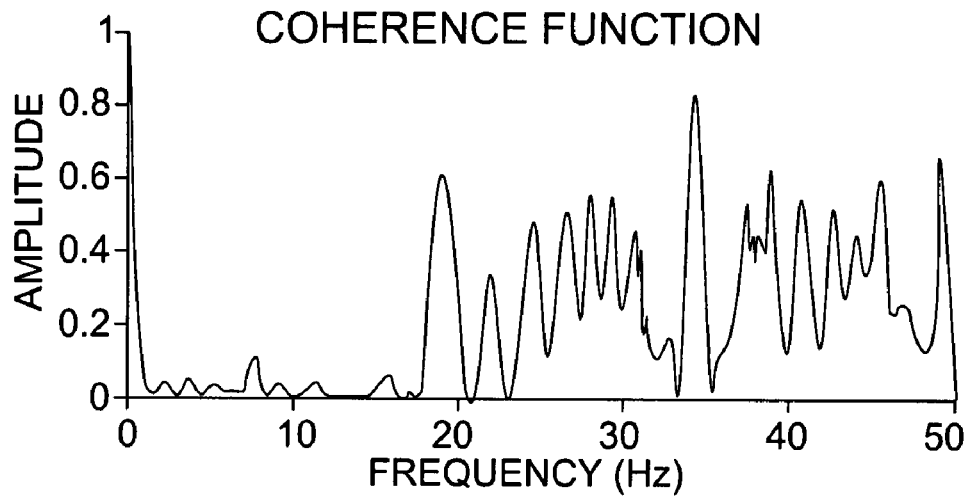
Figure 7:
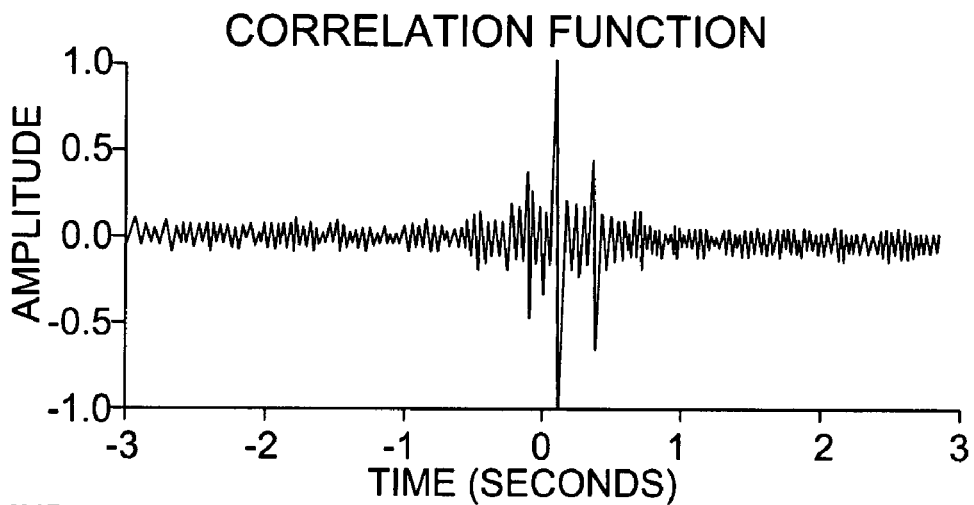
Figure 8:
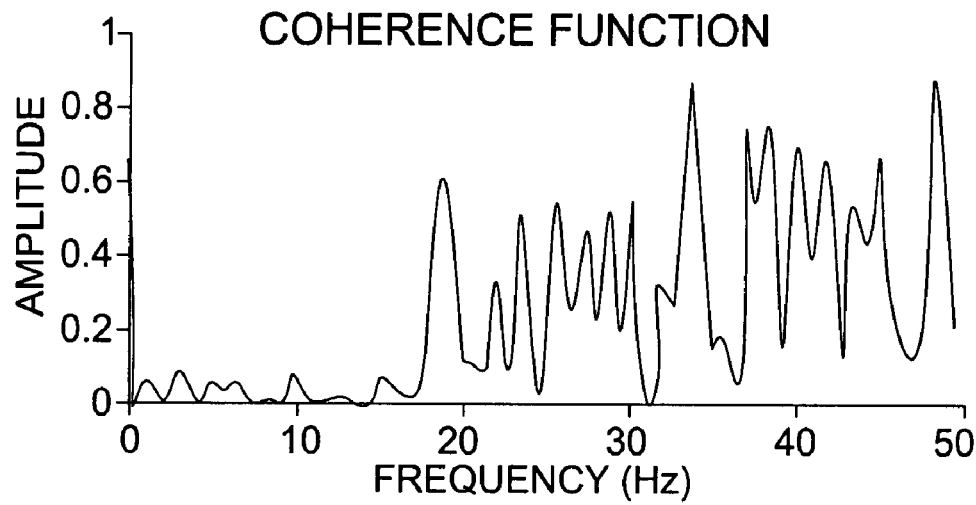
Figure 8:
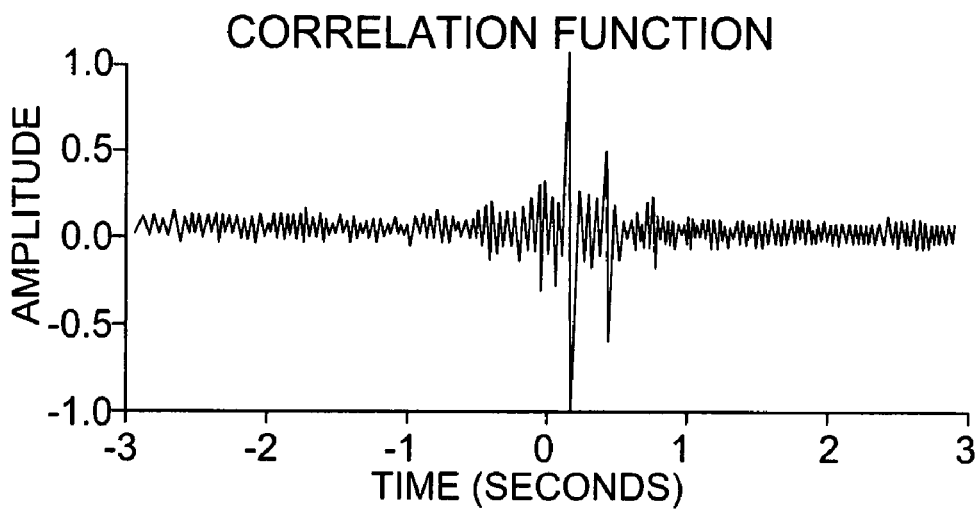
Figure 9:
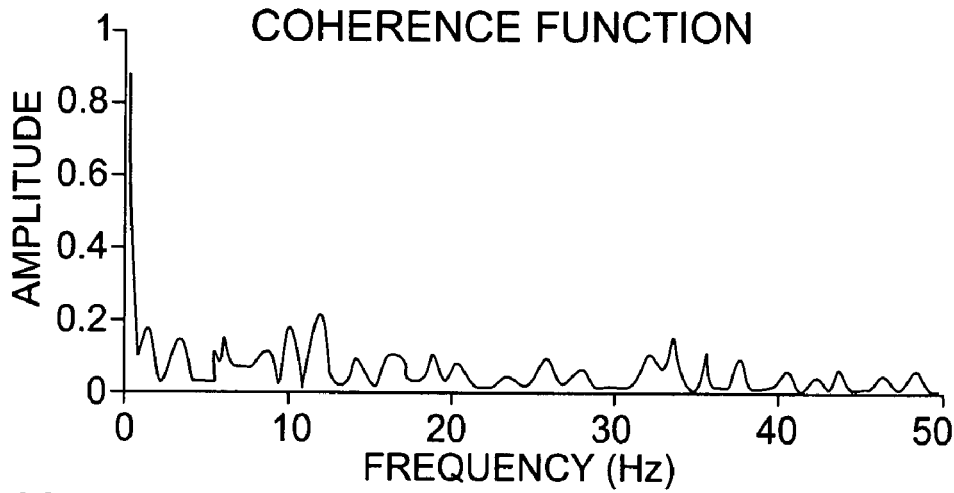
Figure 9:
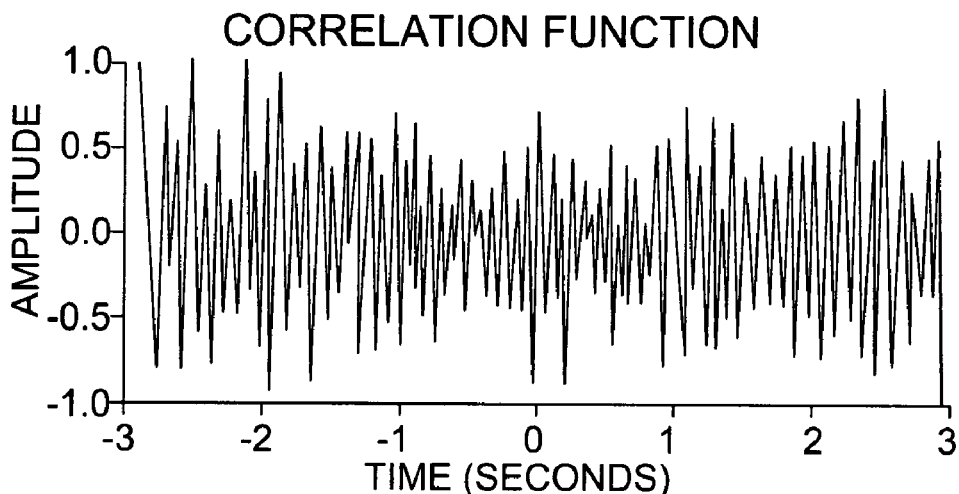

Further measurements of leak signals were made while pumping was off and air being drawn into the pipe through the leak (open 2 and 5 turns) but with geophones at 150 and 300 m (e.g., see FIGS. 6 and 7). The corresponding cross-correlation function had a very clear peak that led to the exact position of the leak at 45.2 m from the sensor attached to the Blue transmitter located at 150 m, when an acoustic velocity of 340 m/s was used (FIG. 8). This again confirmed that the sound of air being drawn into the pipe through the leak propagated through a continuous air cavity along the pipe between the two geophones. However, cross-correlation functions were poor and the leak could not be detected based on similar measurements with geophone pairs at 0 and 300 m, 50 and 300 m, and 100 and 300 m (see FIG. 9). This was taken as an indication that when pumping stopped, sufficient vacuum remained in the pipe to hold back a full wastewater column between the pumping station and a point between the 100 and 150 m excavations.

Figure 10:
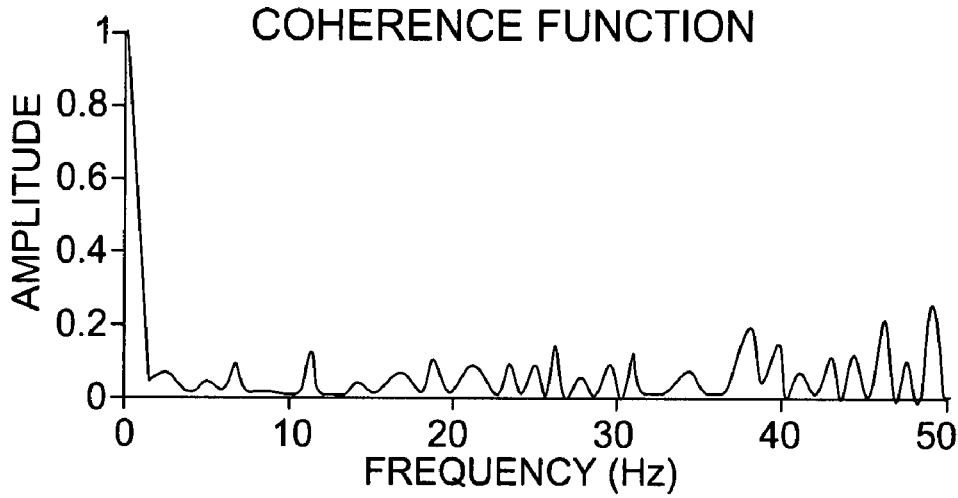
Figure 10:
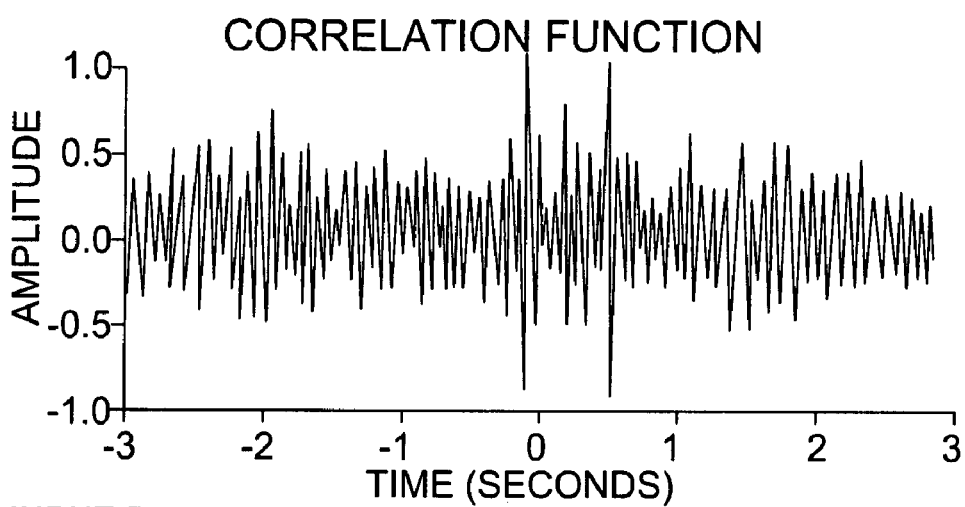
Figure 11:
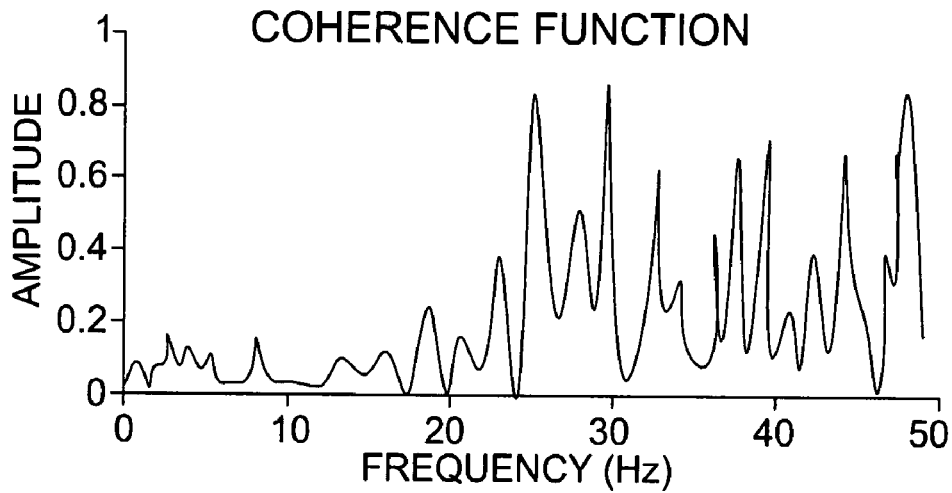
Figure 11:
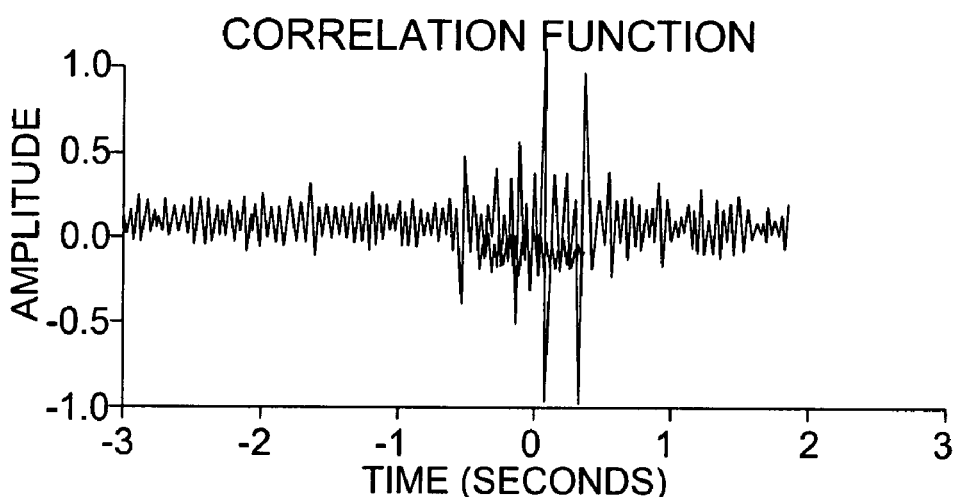

A 2-inch air intake check valve was subsequently installed in the pipe at the 0 m excavation. The valve remained closed during pumping and promptly opened as negative pressure developed in the pipe when pumping stopped. Measurements of leak signals were then repeated with geophone pairs at 100 and 300 m and at 150 and 300 m while pumping was off and air being drawn into the pipe through both the leak opening and the air intake valve at 0 m (see FIGS. 10 and 11). In both cases, cross-correlation functions had a clear peak corresponding to the location of the simulated leak and another peak corresponding to the out-of-bracket noise created by air drawn into the pipe at the intake valve at 0 m.

In view of successfully detecting the simulated leak while pumping was off and the subsequent condition of air being drawn in at the leak and since the focus of these pilot tests was on river-crossing force mains, the design of the simulated leak was then altered as follows. A "T" adaptor was attached to the leak's gate valve and its ends fitted with check-valves acting in opposite directions. The outward opening check-valve was reconnected to the rubber hose that ran to a combined sewer manhole. This valve opened to release wastewater when a pump was on. On the other hand, the inward opening check-valve was connected to a rubber hose that ran to a nearby aboveground water tank replenished by a 2000-gallon water truck. This valve opened allowing water to be drawn into the pipe as negative pressure developed in the pipe when pumping stopped.

Figure 12:
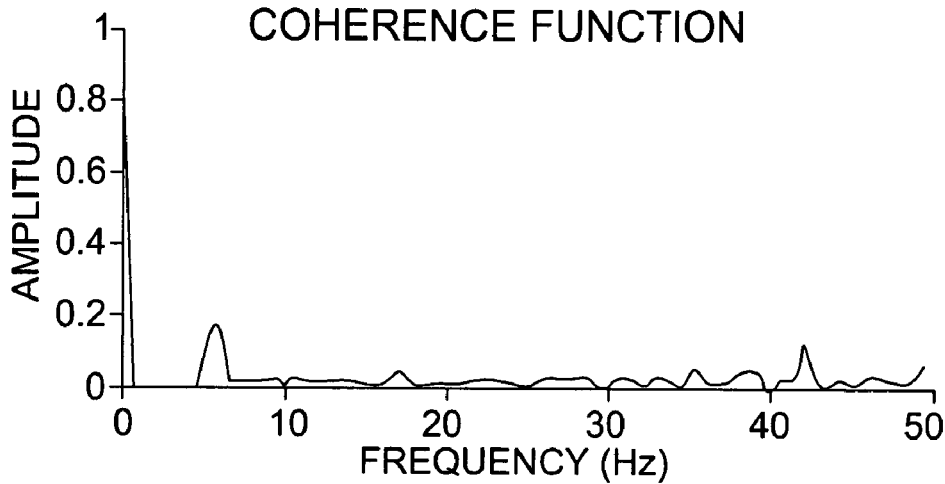
Figure 12:
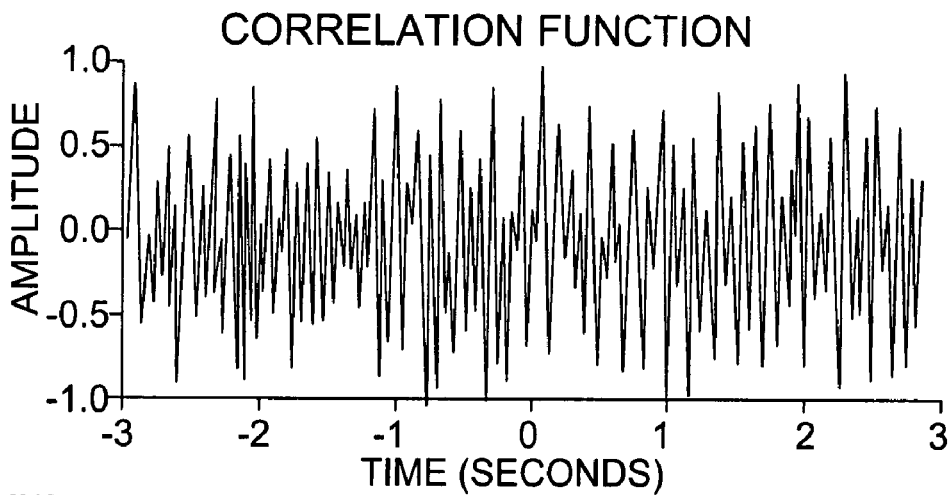

Acoustic leak signals were then measured with geophones at 150 and 300 m while water was being drawn into the pipe through the simulated leak due to negative pressure developed in the pipe following pump shutdown. Unfortunately, the cross-correlation function of these leak signals did not display a pronounced peak and hence the leak could not be detected (see FIG. 12). Following these measurements, it started to rain heavily for about one hour. During this time and for a short period after, both pumps in the pumping station were on continuously. The gate valve of the simulated leak was turned off to reduce runoff back to the pumping station hoping to hasten the pumps shutdown.

Figure 13:
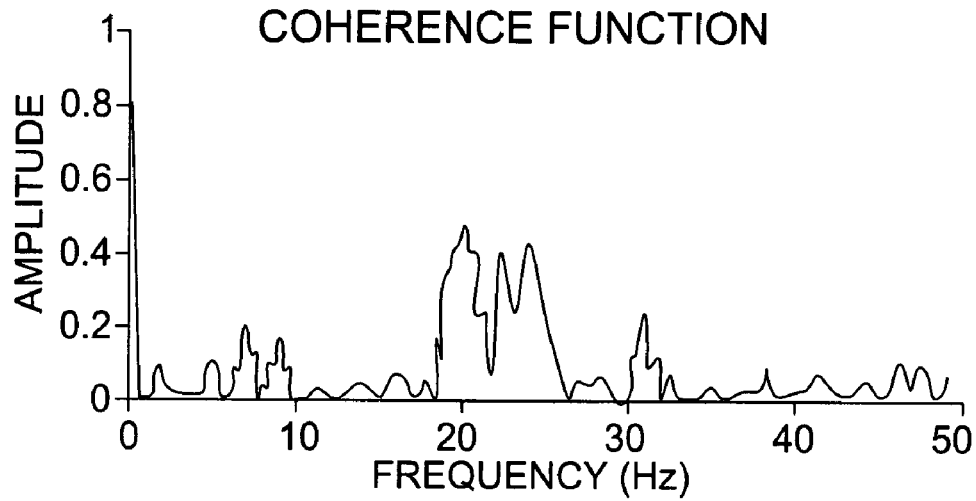
Figure 13:
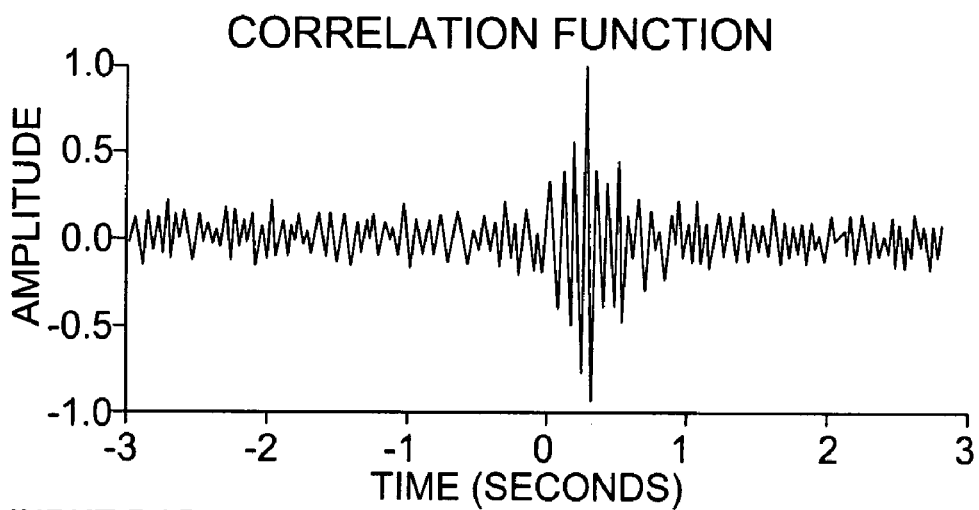
Figure 14:
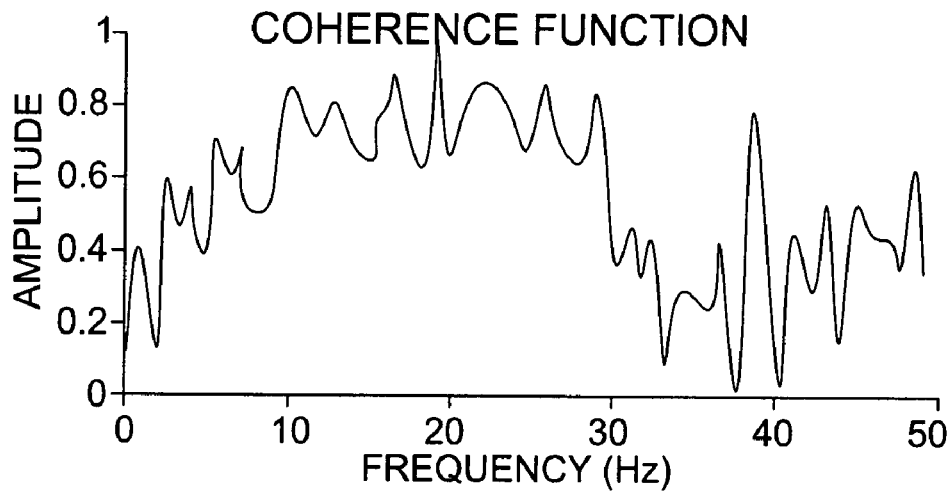
Figure 14:
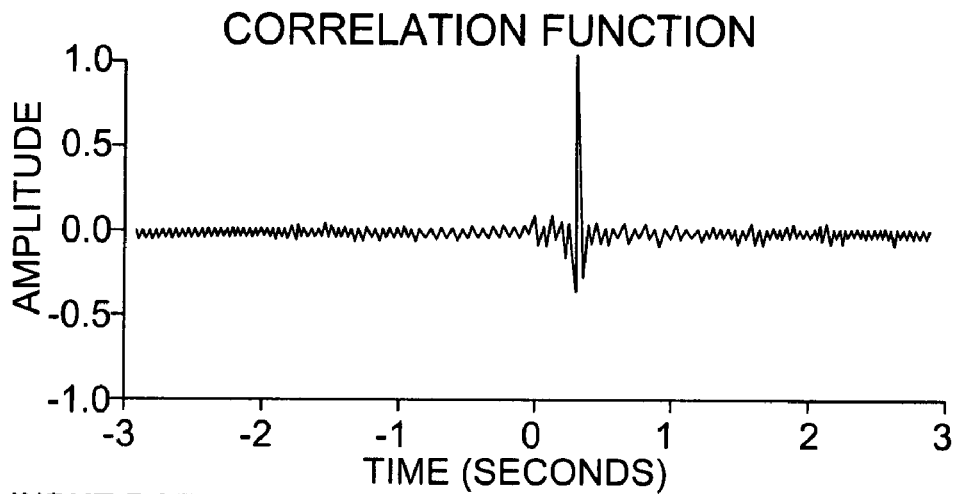

With geophones still at 150 and 300 m, acoustic signals had a cross-correlation function with a pronounced out-of-bracket peak on the side of the pumping station (see FIG. 13). This peak was achieved after both pumps were operating continuously at the pump station for almost one hour. Both pumps were on and the valve of the simulated leak was closed during the test. This was the first time that a peak corresponding to noise from the pumping station was detected since the beginning of field tests 4 days earlier. The reason that noise from the pumping station had become detectable was believed to be that as a result of prolonged pumping the pipe had become fully filled with wastewater from the pumping station to at least the 300 m excavation. A continuous wastewater core made it possible for acoustic noise from the pumps to propagate to both sensors through the wastewater core. This was confirmed by the fact that acoustic velocity corresponding to the out-of-bracket peak was very close to the theoretical value of 440 m/s for a water-filled pipe of the same type and diameter. When the gate valve of the simulated leak was then opened 2 and 5.5 turns, while above conditions continued, the cross-correlation function had no peak corresponding to the location of the simulated leak; only a pronounced peak corresponding to the out-of-bracket noise from the pumping station (see FIG. 14).

Figure 15:
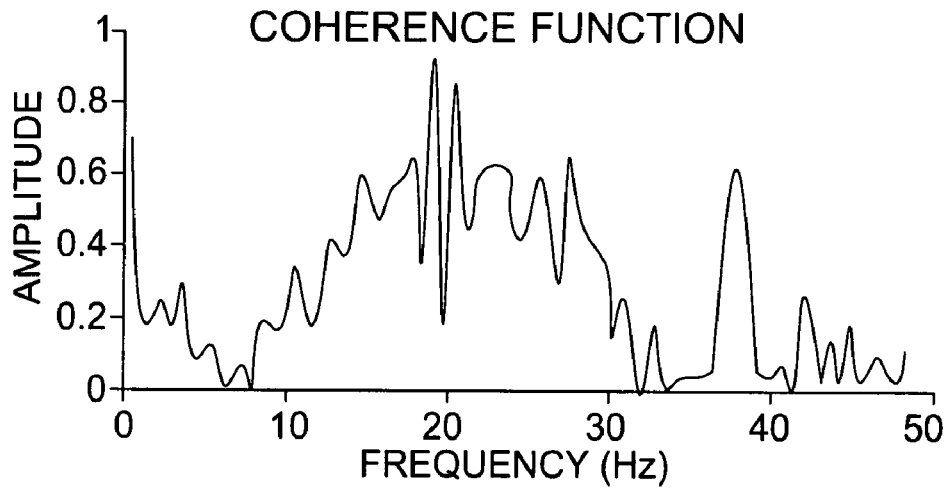
Figure 15:
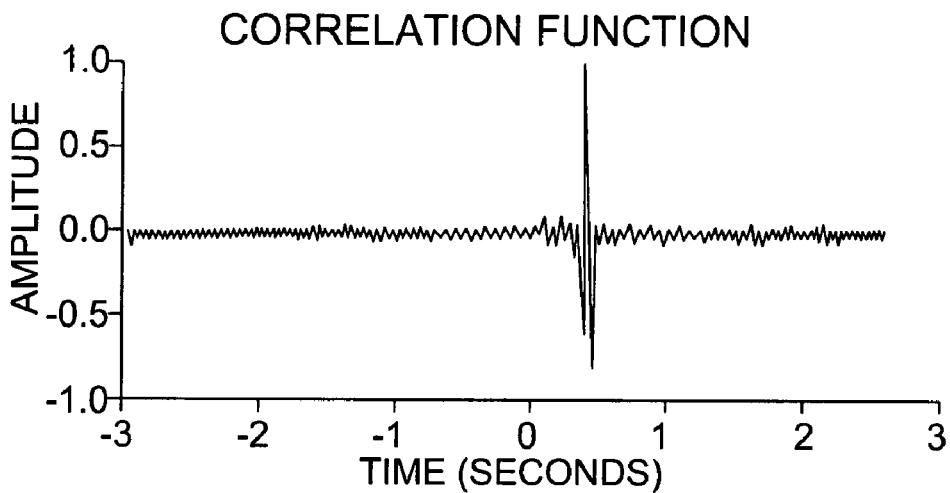
Figure 16:
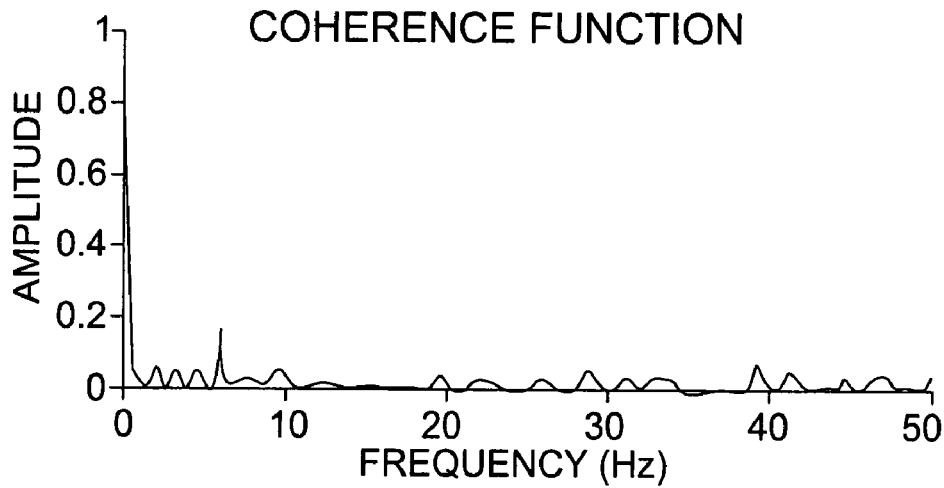
Figure 16:
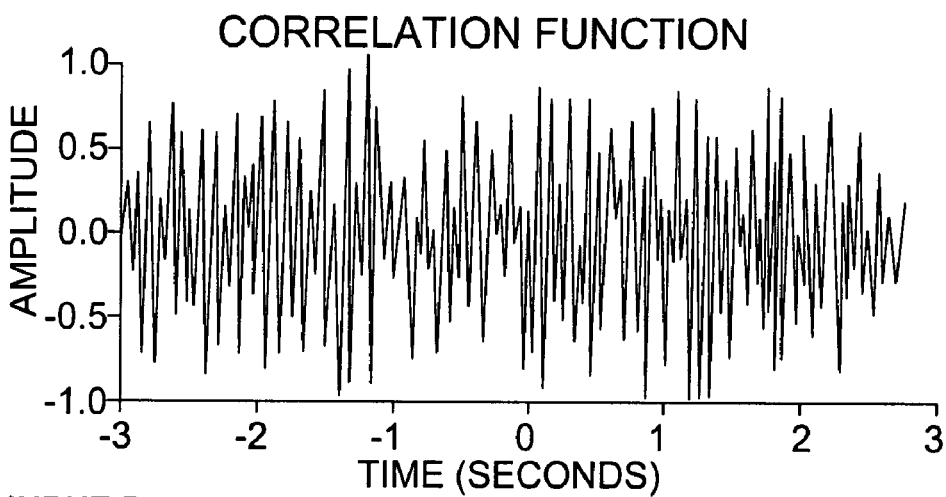

After having the force main operate normally overnight, acoustic signals in the main were measured with geophones at 0 and 300 m while a pump was on and the simulated leak still shut from the previous day. From the outset the resulting cross-correlation function displayed a very pronounced out-of-bracket peak on the side of the pumping station (see FIG. 15). The corresponding acoustic velocity was about 465 m/s, which is close to the theoretical value of 440 m/s. This indicated that while the pipe operated normally overnight, it had the time to fill with water to at least the 300 m excavation and remained so afterwards. To maintain this condition, air was not allowed to be drawn into the pipe through the simulated leak in later field tests. There were no distinct peaks in cross-correlation functions from similar subsequent measurements while the pumps were off and the simulated leak still not turned on (see FIG. 16).

Figure 17:
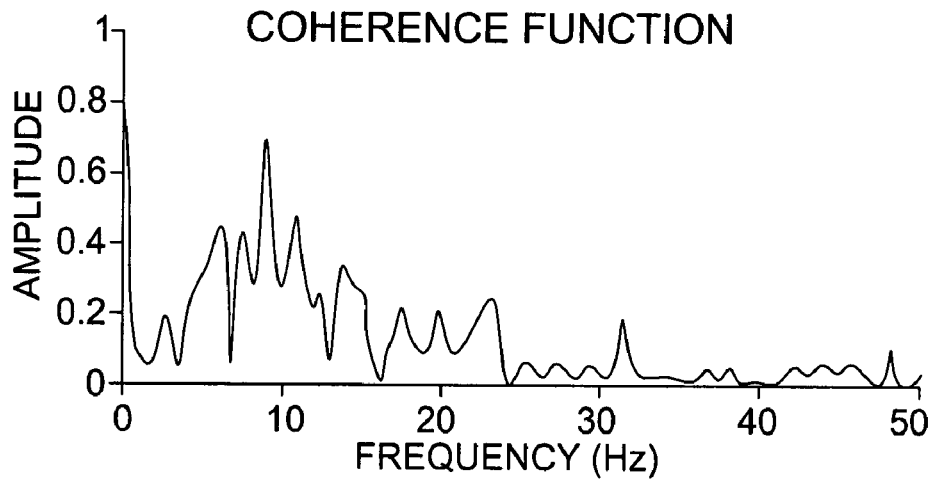
Figure 17:
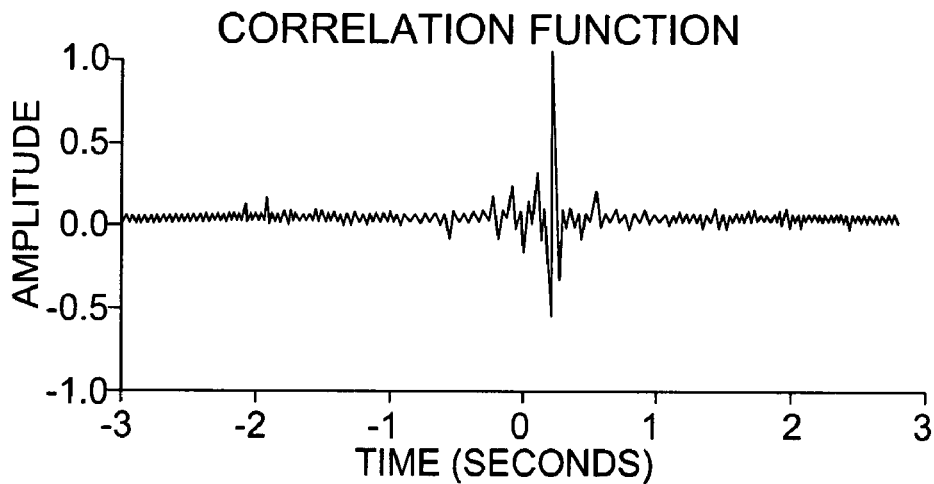
Figure 18:
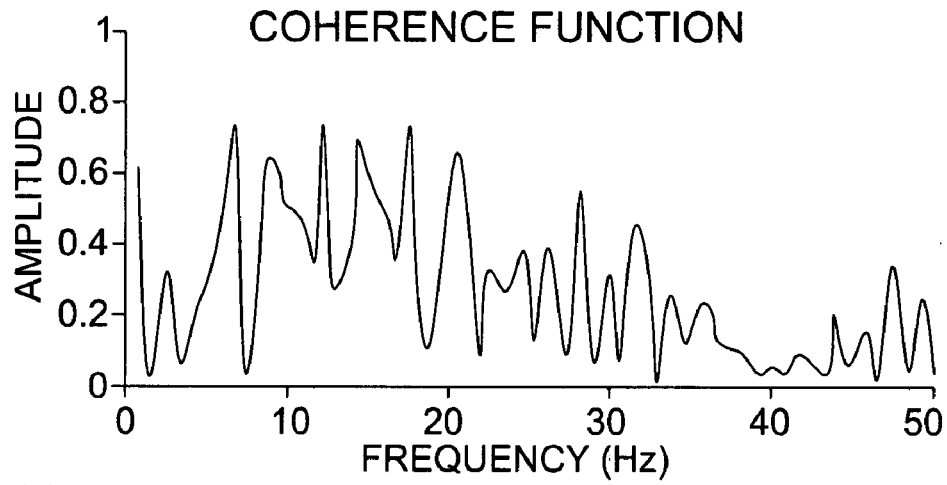
Figure 18:
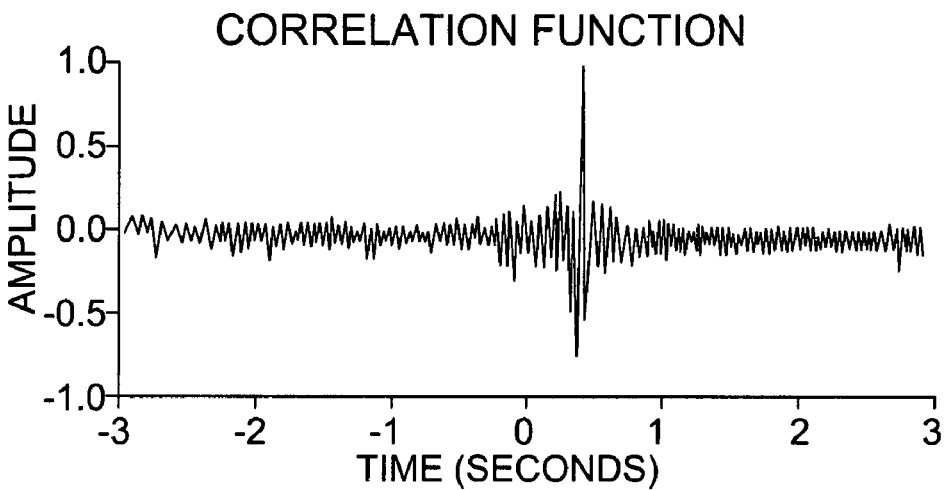
Figure 19:
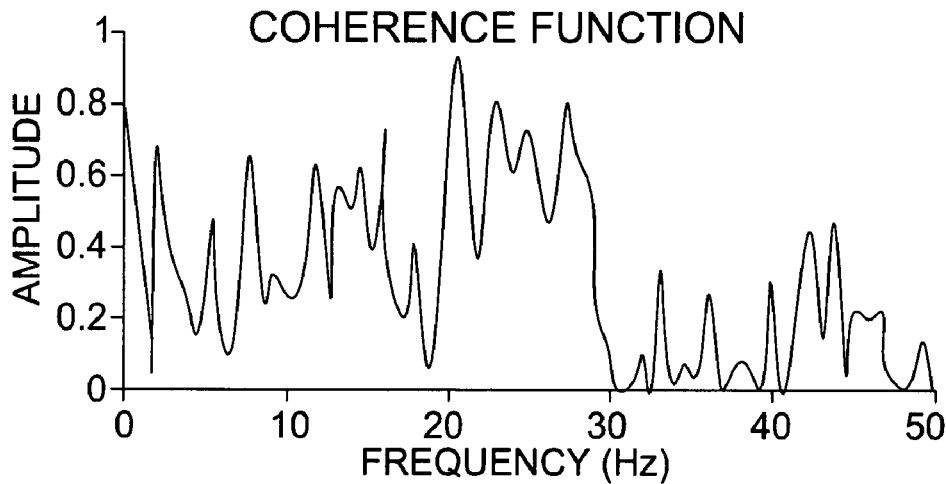
Figure 19:
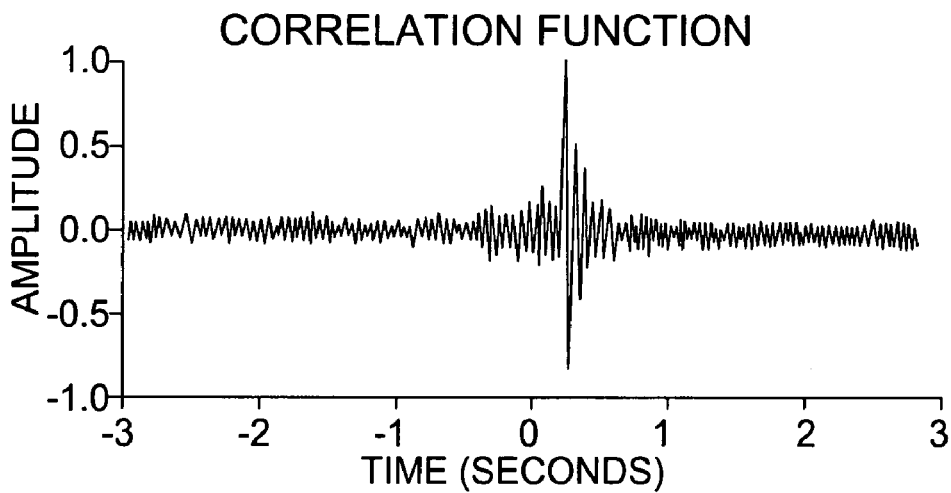
Figure 20:
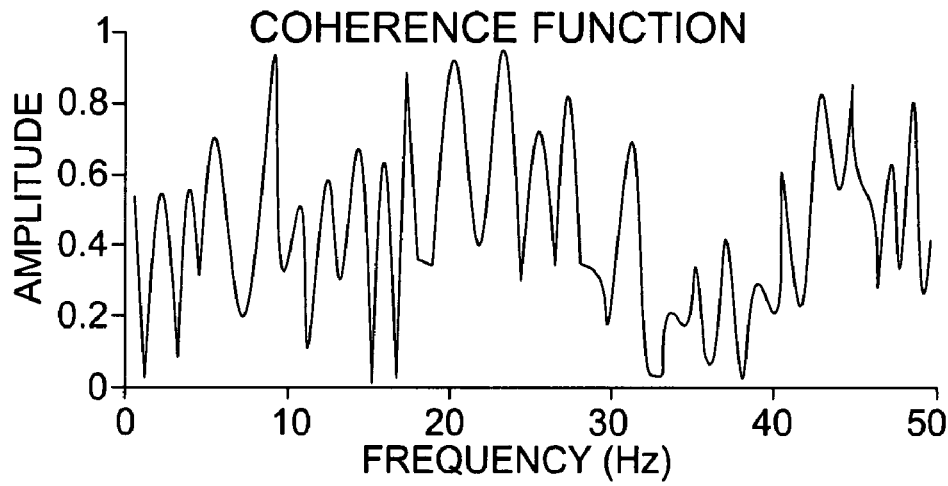
Figure 20:
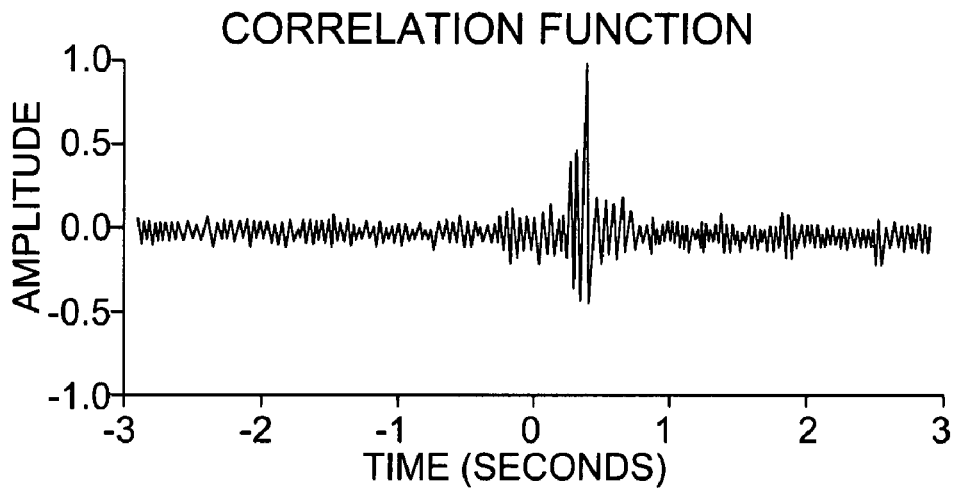

While geophones were still at 150 and 300 m, leak noise signals were then measured when pumping stopped and while water was being drawn in at the simulated leak (5.5 turns open). The resulting cross-correlation function had a distinct peak that accurately corresponded to the actual location of the simulated leak. However, subsequent repeats of these measurements failed to detect the leak; the reason is believed to be as follows. The more water drawn into the pipe through the leak, the closer the free end of the wastewater column became to the pipe section between leak sensors, before it reached steady position. Since negative pressure is believed to be highest near the free end, it will also increase in the pipe section between sensors (i.e., lead to more negative pressure). Subsequently, more of the air/gases that are dissolved in the wastewater are released as free bubbles that slow down acoustic waves and significantly increase the attenuation of acoustic leak signals making them undetectable. This was confirmed based on measured acoustic velocities that decreased with time as more water was drawn into the pipe. Acoustic velocity decreased from ~470 m/s before water was drawn in (see FIG. 15) to ~400 m/s a while after water started to be drawn in (see FIGS. 17 and 18), then it stabilized at about 425 m/s (see FIGS. 19 and 20).

Figure 21:
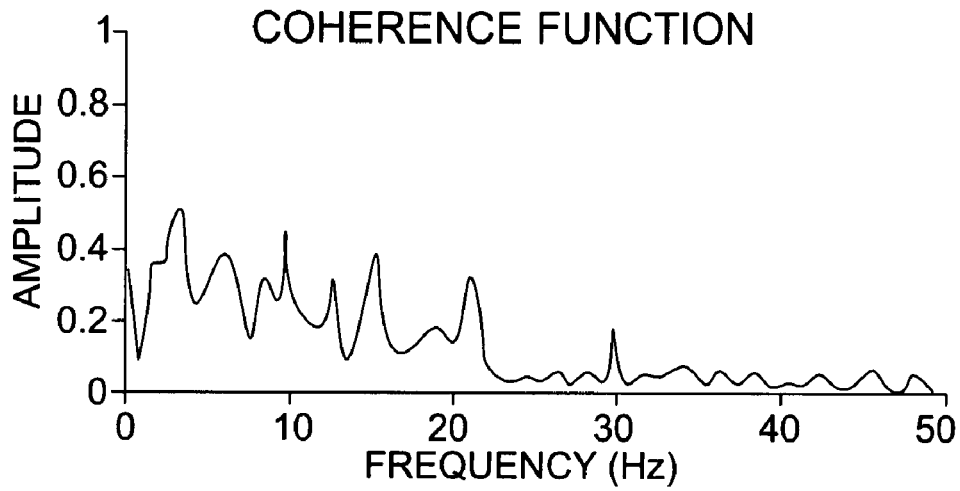
Figure 21:
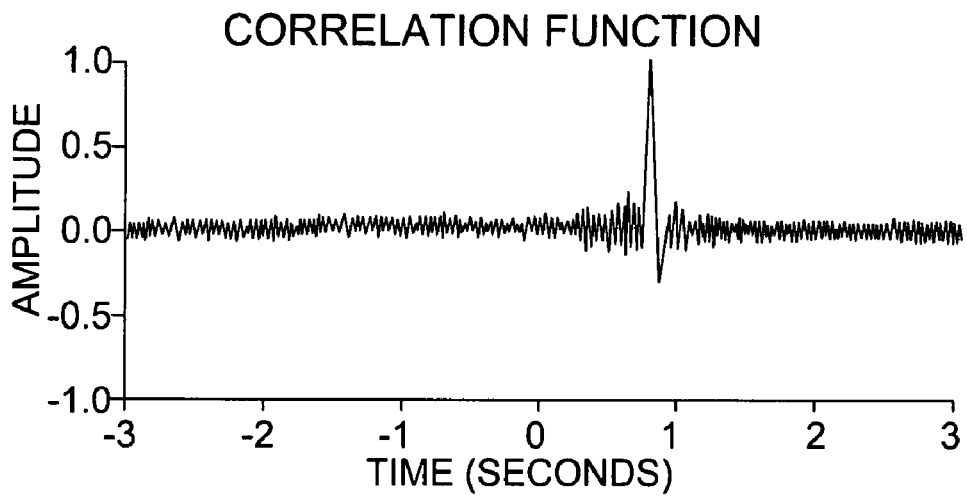
Figure 22:
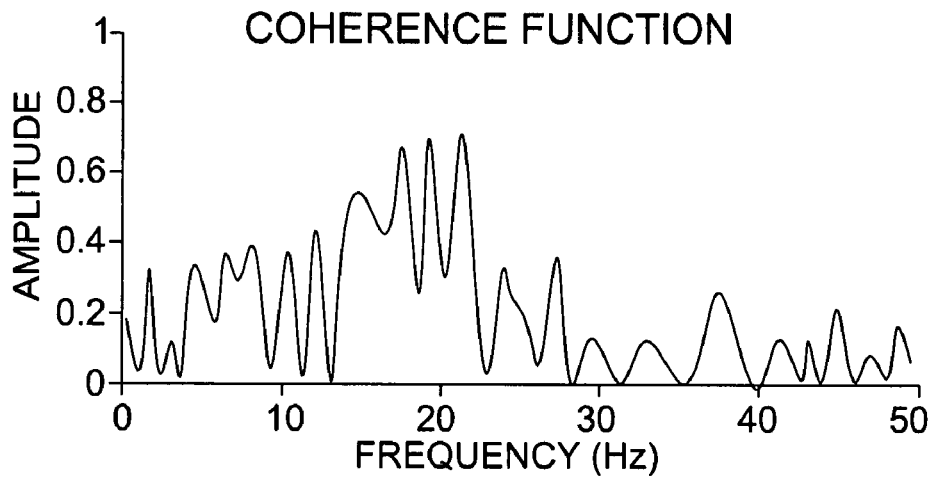
Figure 22:
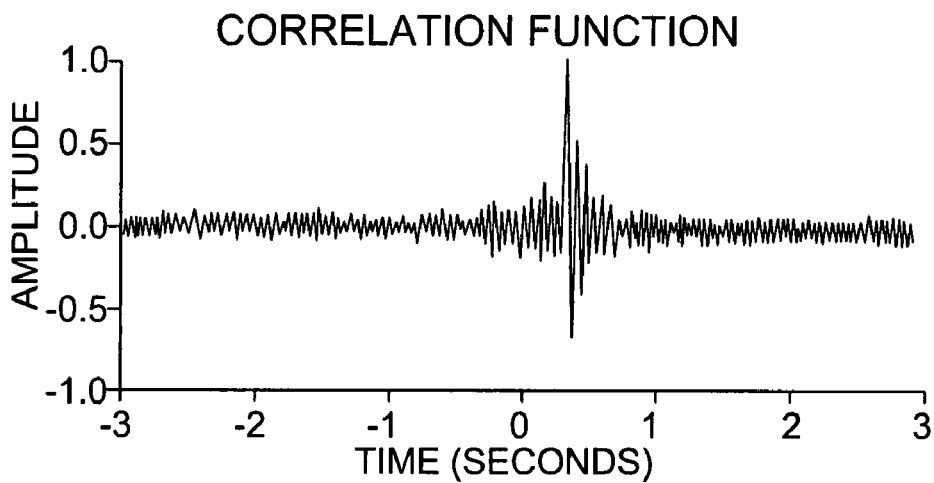

In further measurements of acoustic signals with hydrophones at 0 and 300 m while pumping was on, there were no peaks in cross correlation functions that corresponded to the simulated leak regardless of its size (2, 5.5 and 11 turns open). There was only a distinct out-of-bracket peak on the side of the pumping station (e.g., see FIGS. 21 and 22). It made no difference whether the signal from the transducer of the hydrophone near the pumping station was attenuated by 40 dB or not.

Figure 23:
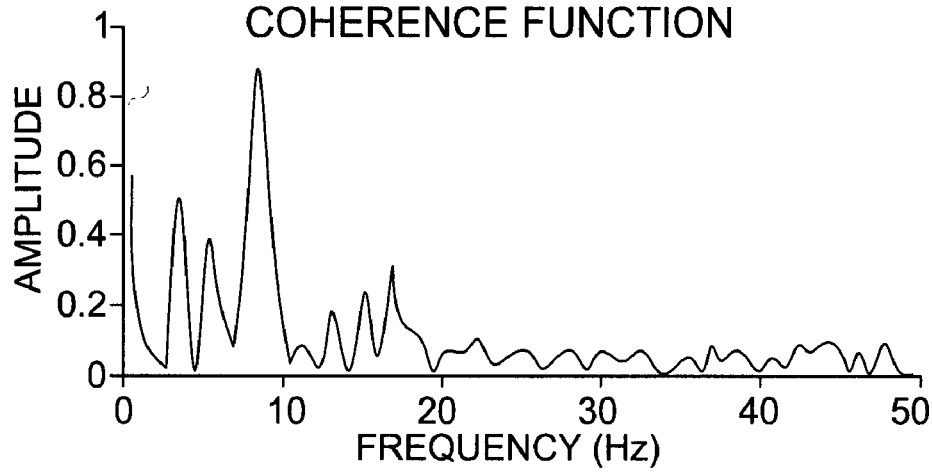
Figure 23:
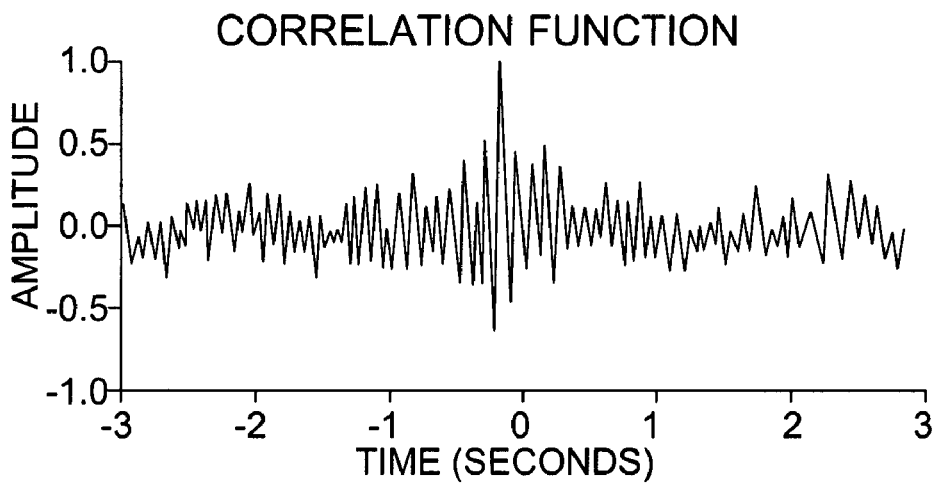
Figure 24:
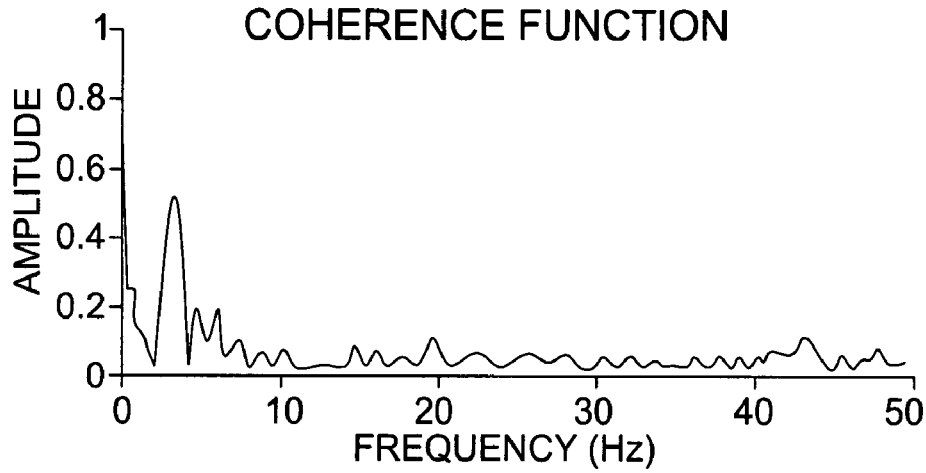
Figure 24:
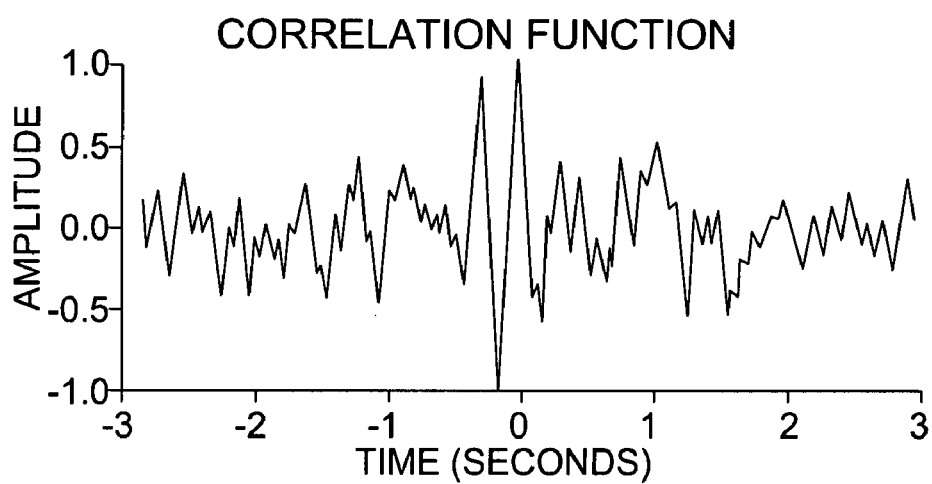
Figure 25:
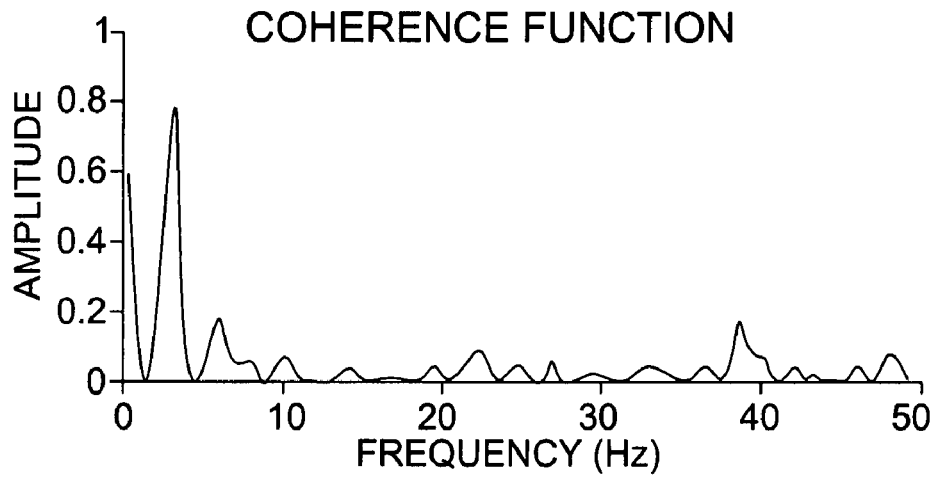
Figure 25:
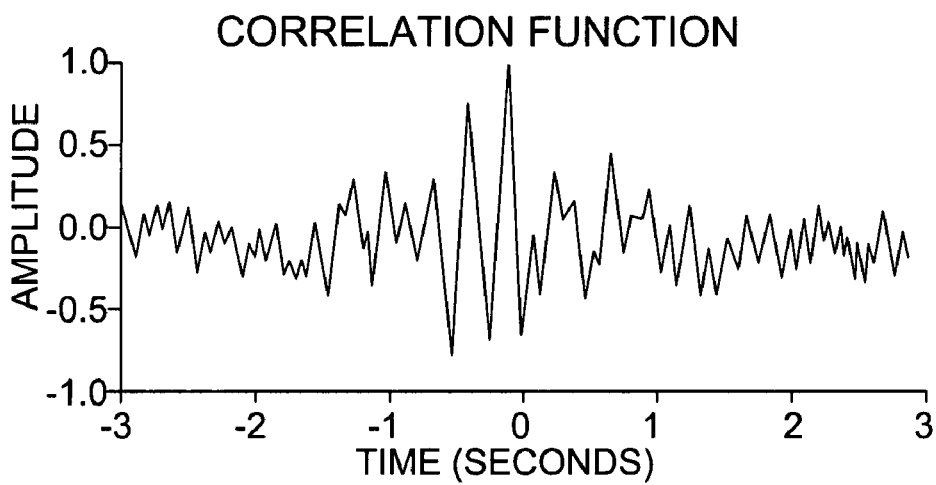

Finally, the simulated leak was detected as a distinct peak in the cross-correlation function of acoustic signals measured with hydrophones at 0 and 300 m while pumps were off and water drawn in through the leak by negative pipe pressure (e.g. see FIGS. 23, 24, and 25). This was achieved for small, medium and large leak openings (gate valve 2, 5.5 and 11 turns open), both soon after the leak was opened and several hours later, i.e., after the pipe had reached a steady hydraulic state. However, as expected, there was a discrepancy in the predicted location of the simulated leak. The predicted location was closer to the Blue wireless station by 5 to 30 m than the actual location.

Discrepancy in predicted leak location is believed to be due to variation of acoustic velocity along the pipe, specifically being higher between the Blue station and leak than between the leak and White station. As noted earlier, negative pressure in the pipe after pumping stops is believed to be highest near the free end of the wastewater core and becomes less severe in the direction of the pumping station. Subsequently, more of the dissolved air/gases are released as free bubbles in the White station to leak section than in the leak to Blue station section. The more bubbles in the wastewater the slower the acoustic velocity.

Figure 26:
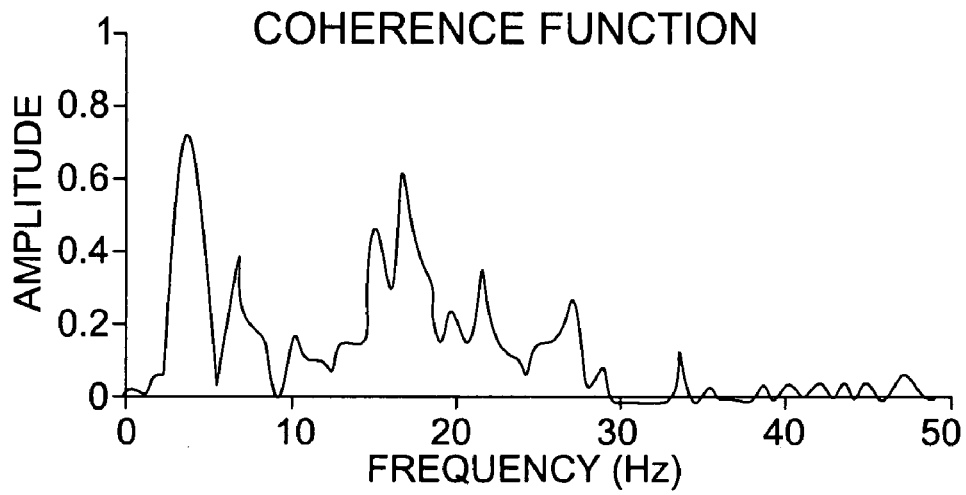
Figure 26:
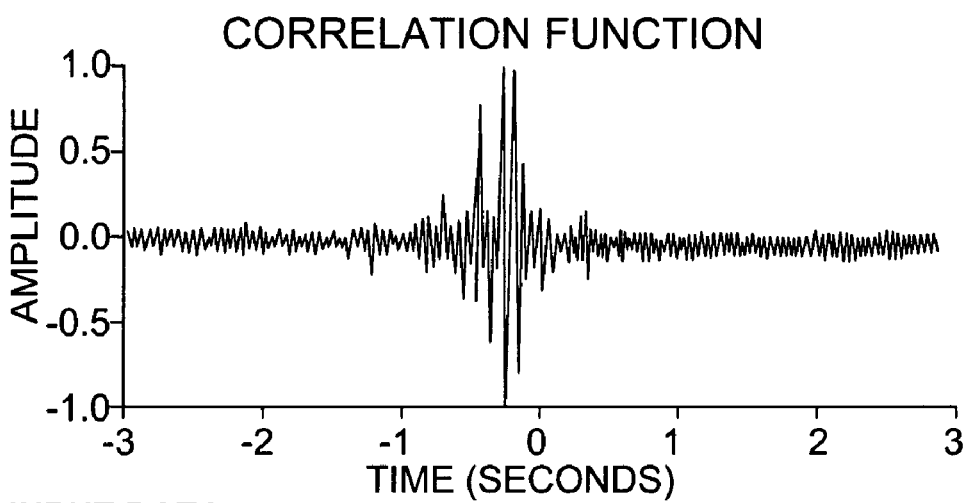
Figure 27:
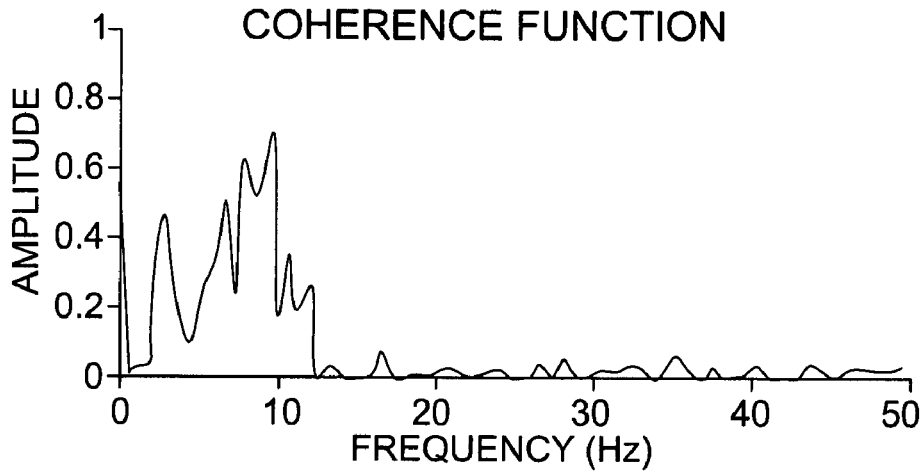
Figure 27:
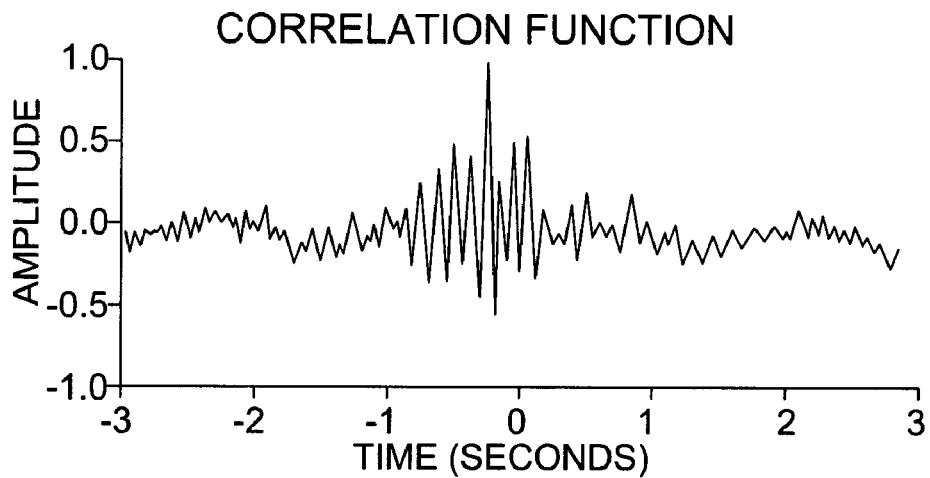
Figure 28:
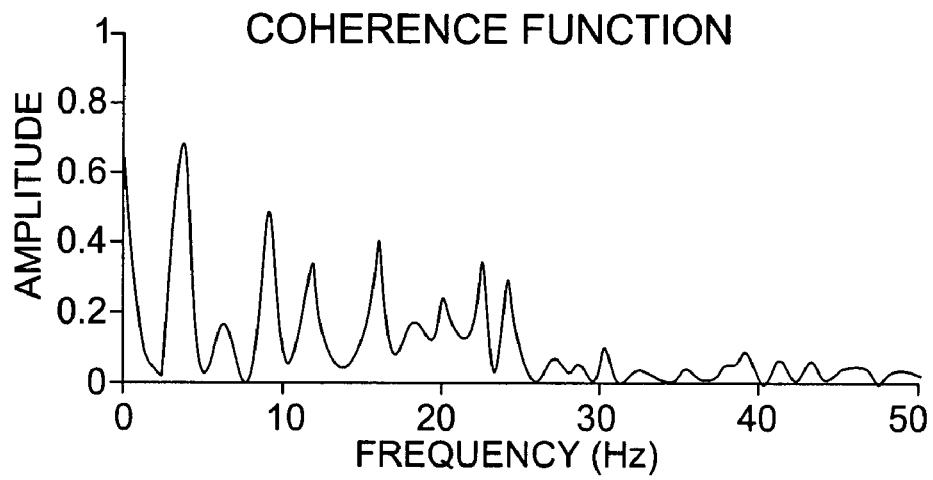
Figure 28:
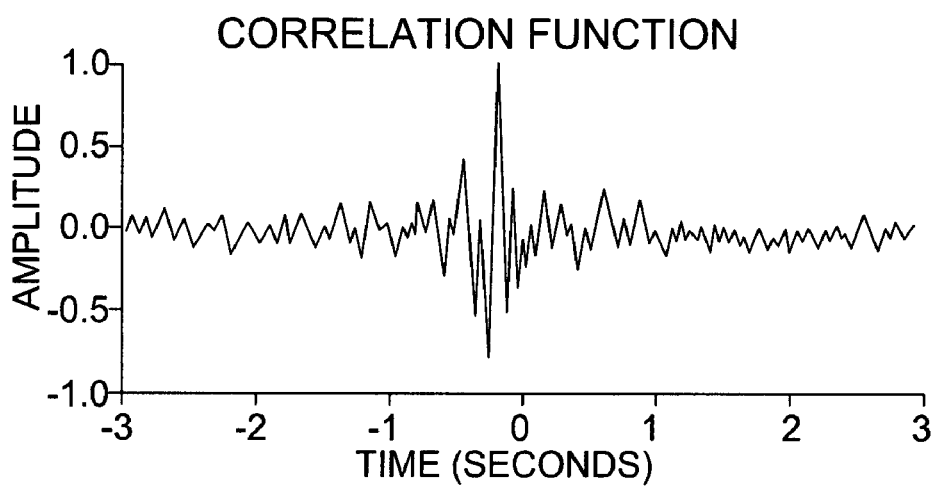

As more water was drawn into the main through the simulated leak, the free end of the wastewater core became closer to the pipe section between sensors and hence the difference in the negative pressures in the White station to leak and leak to Blue station became greater. Subsequently, predicted location of the simulated leak became progressively closer to the Blue station with time (compare FIG. 23 with FIG. 26). In another test, the peak in cross-correlation moved closer to the Blue station as more signals were summed into the average of the Fast Fourier Transform. The most accurate predicted location was obtained when opening the leak after it was shut for a long period (see FIGS. 27 and 28), which helped keep the free end of wastewater core further down stream since no negative pressure was relieved at the leak.

Figure 29:
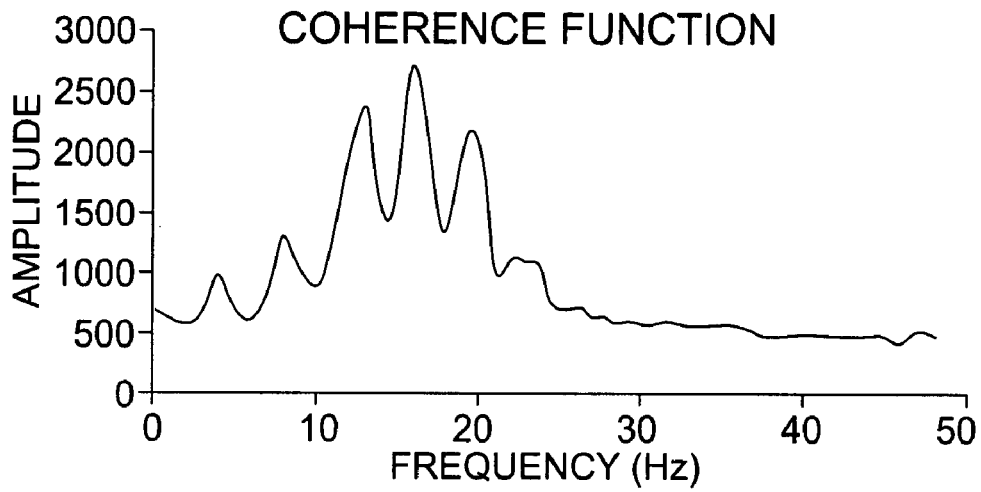
Figure 29:
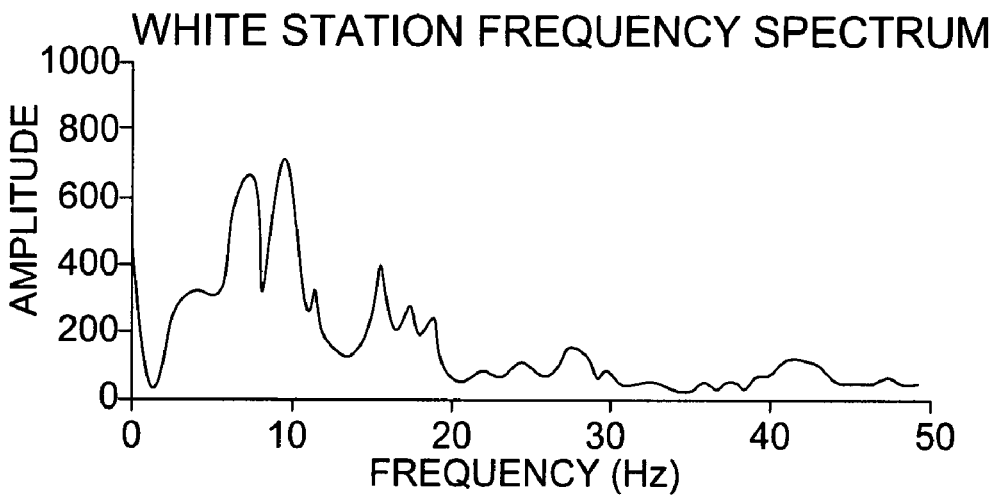
Figure 30:
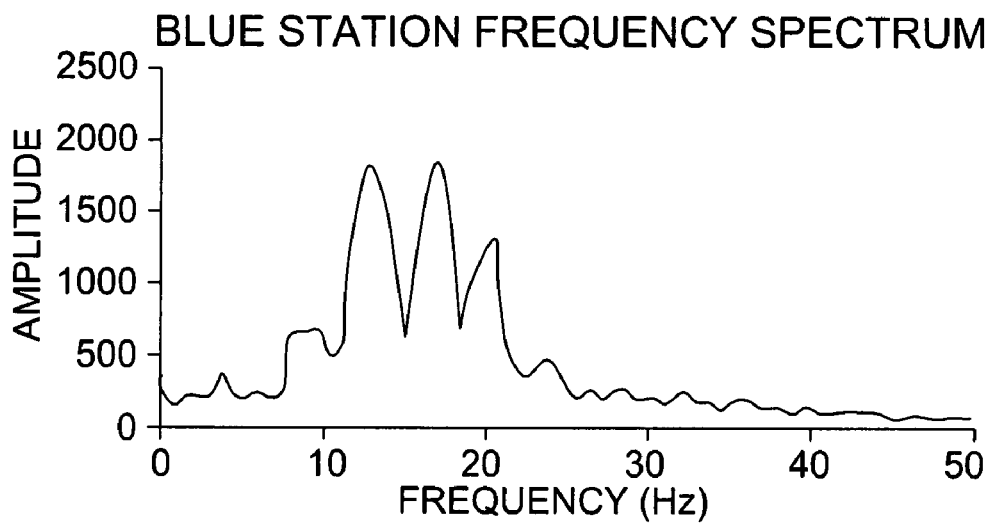
Figure 30:
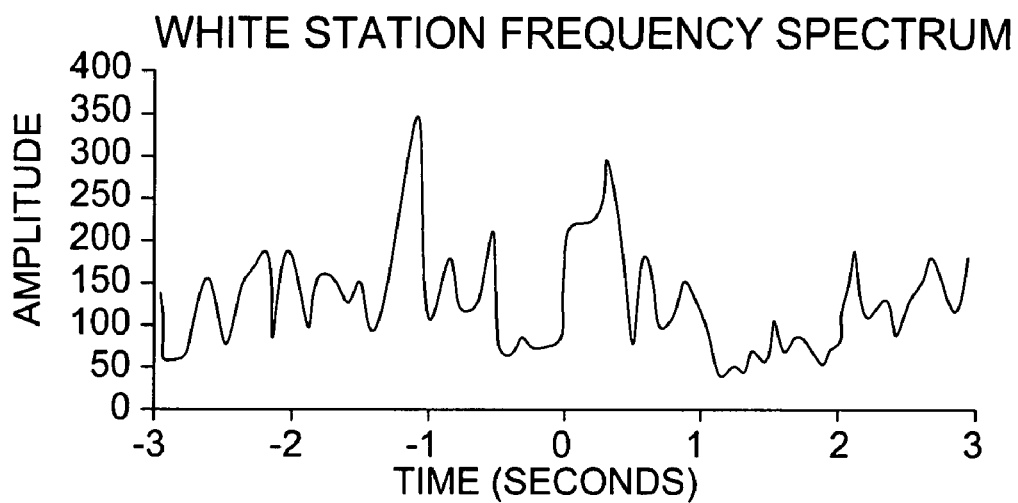
Figure 31:
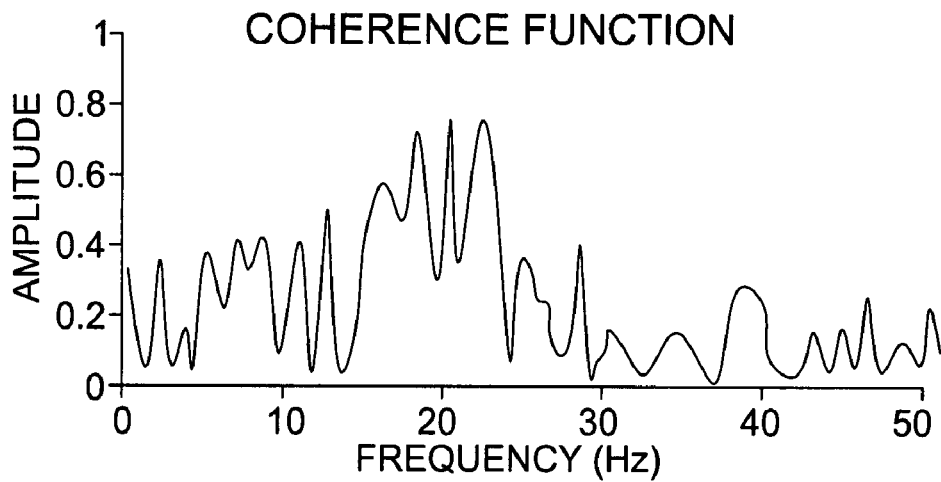
Figure 31:
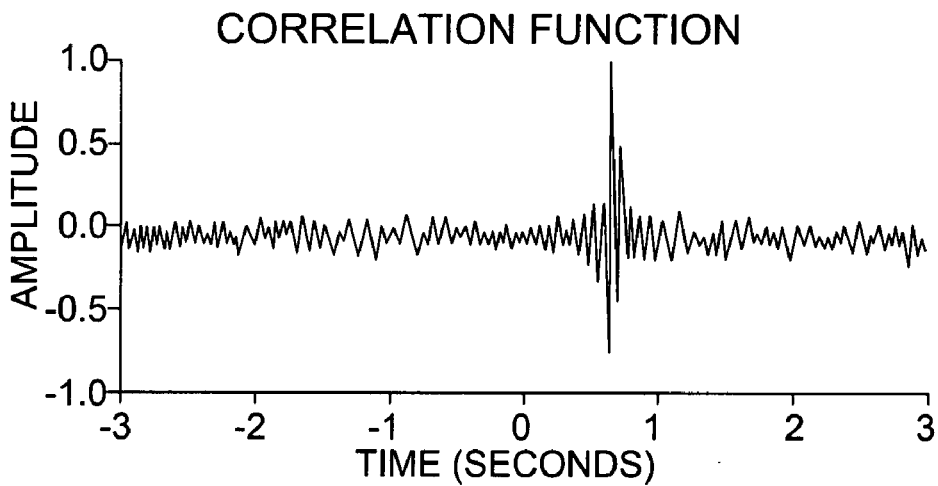
Figure 32:
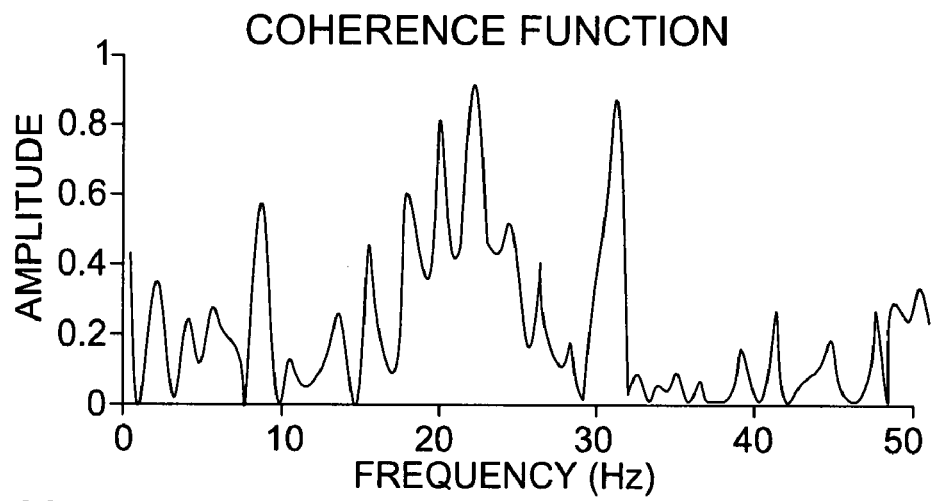
Figure 32:
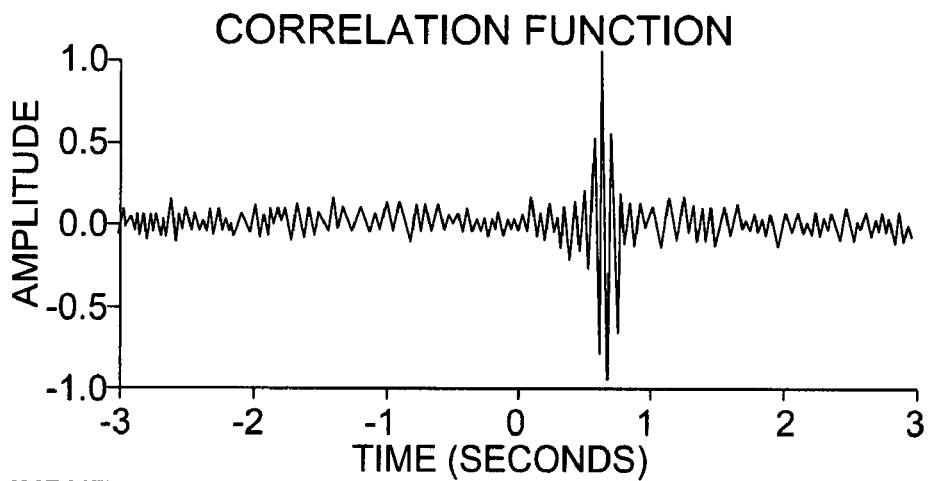
Figure 33:
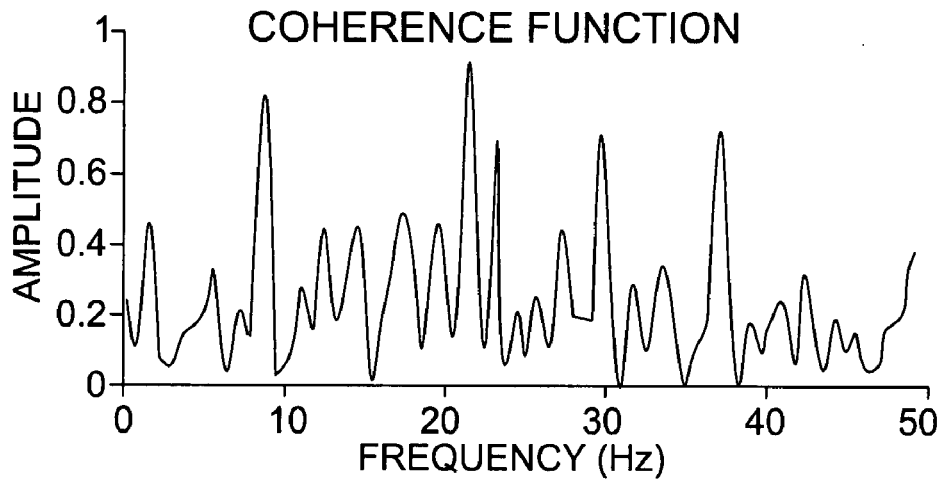
Figure 33:
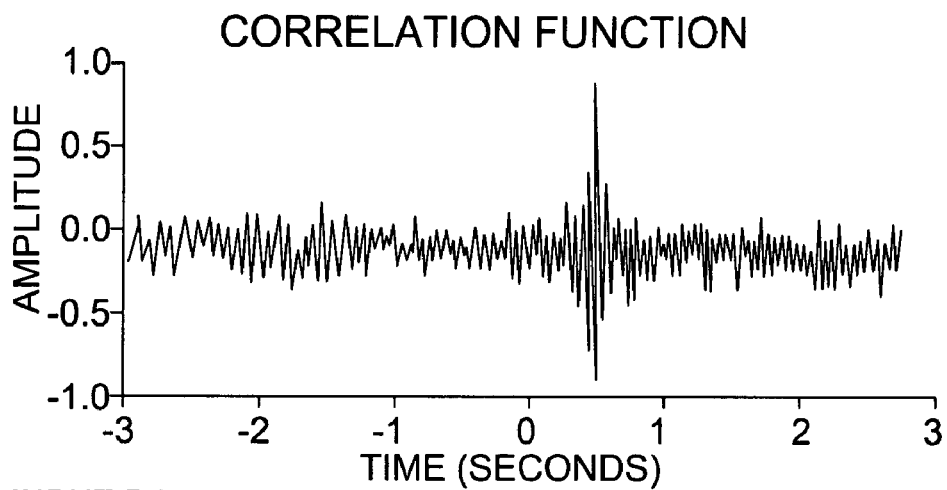

The high frequency content of leak signals decreased progressively with time (compare FIGS. 29 and 30). The progressive change in the predicted leak location with time was much slower when the leak's gate valve was open only 2 turns than when it's open fully. This is expected since the less water drawn into the pipe, the slower the free end of the wastewater core moves towards the pipe section between acoustic sensors.

An opposite trend was observed for measured acoustic velocity in the pipe based on the out-of-bracket cross-correlation peak corresponding to noise from the pumping station. The velocity progressively increased with time (e.g., compare 31, 32 and 33, performed in sequence). In other tests, the measured acoustic velocity became faster as more signals were summed into the average of the Fast Fourier Transform. It was also observed that measured acoustic velocity increased as the flow rate of the simulated leak decreased.

Based on the abovementioned pilot tests on a 450 mm diameter and ~300 m long PVC pipe section having a simulated leak, it can be correlation of acoustic leak noise signals, while fluid in the pipe is under negative pressure, is viable for continuous monitoring of leakage in river-crossing wastewater force mains. Both small and large simulated leaks were successfully detected although. The simulated leak, regardless of its size, could not be detected in the usual way, i.e., under positive pressure while the pump(s) were on.

Negative internal pressure that develops in force mains following pump shutdown produced favourable conditions for acoustic correlation, i.e., high-enough acoustic signals created by water drawn into the pipe through the leak while background noise was low. Success was achieved using hydrophones ~300 m apart, a distance deliberately selected as maximum river-crossing pipe length. However, predicted leak location was off by up to 10% of sensors spacing. This was expected due to the variation of acoustic velocity along wastewater pipes.

When implementing acoustic correlation for river-crossing force mains, hydraulic models should first be developed for flows in these mains. The models would be used to verify if necessary conditions are met, namely that the pipe section between intended sensor locations remains fully filled with wastewater and is under negative pressure following pump shutdown.

We claim:

1. A method of detecting leakage in a pipe for carrying a pressurized fluid, comprising:
   isolating a section of said pipe;
   creating conditions of negative pressure in said isolated section of said pipe so that external fluid is drawn into said isolated section to generate noise or vibration at a leak location;
   generating signals corresponding to said noise or vibration from spaced sensors located on said pipe; and
   analyzing said signals to determine the location of said leak.

2. A method as claimed in claim 1, wherein said negative pressure is induced by withdrawing fluid from the isolated section of the pipe.

3. A method as claimed in claim 1, wherein said pipe is at least partially immersed in water, and said external fluid is said water.

4. A method as claimed in claim 3, wherein said pipe is a submarine pipe extending across a river or body of water.

5. A method as claimed in claim 1, wherein said external fluid is air.

6. A method as claimed claim 1, wherein said signals are analyzed by cross correlation techniques.

7. A method as claimed in claim 1, wherein said sensors are hydrophones.

8. A method as claimed in claim 1, wherein said sensors are vibration sensors.

9. A method of detecting leakage in a pipe carrying a pressurized fluid, comprising:
   creating conditions of negative pressure in said pipe so that external fluid is drawn into said pipe to generate noise or vibration at a leak location;
   generating signals corresponding to said noise or vibration from spaced sensors located on said pipe; and
   analyzing said signals to determine the location of said leak, and
   wherein said negative pressure is induced by shutting off a pump forcing said pressurized fluid through said pipe, said negative pressure arising in a period following pump shutdown.

10. A method as claimed in a claim 9, wherein the pressurized fluid in the pipe is wastewater.

11. A method as claimed in claim 9, wherein the pump is periodically run and shutdown to permit leak detection during periods of pump shutdown.

12. A system for detecting leakage in a pipe carrying pressurized fluid, comprising:
    valves for isolating a section of the pipe;
    at least two spaced sensors located on the pipe;
    means for creating negative pressure in the isolated section of the pipe to draw external fluid into the pipe from the ambient at the location of a leak; and
    a computer programmed to determine the location of the leak by analyzing signals representing noise or vibration occurring at the location of said leak.

13. A system as claimed in claim 12, wherein said pipe is a submarine pipe extending across a river or body of water.

14. A system as claimed in claim 12, wherein the pipe is exposed at the location of the leak, and said external fluid is air.

15. A system as claimed in claim 12, wherein the pipe is a pressurized water distribution pipe.

16. A system as claimed in claim 15, wherein the means for creating negative pressure in the pipe includes a pump for withdrawing fluid from within the pipe.

17. A system as claimed claim 12, wherein said computer is programmed to analyze said signals by cross correlation techniques.

18. A system as claimed in claim 12, wherein said sensors are hydrophones.

19. A system as claimed claims 12, wherein said sensors are vibration sensors.

20. A system for detecting leakage in a pipe carrying pressurized fluid, comprising:
    a pump for forcing the pressurized fluid through the pipe;
    at least two spaced sensors located on the pipe;
    a switch for shutting down the pump for an interval to create negative pressure in the isolated section of the pipe so that external fluid is drawn into the pipe from the ambient at the location of a leak; and
    a computer programmed to determine the location of the leak by analyzing signals representing noise or vibration occurring at the location of said leak.

21. A system as claimed in claim 20, wherein the pipe is a wastewater force mains.

22. A system as claimed in claim 21, wherein said pipe is at least partially immersed in water, and said external fluid is said water.

23. A system as claimed in claim 20, comprising a controller for periodically running the pump and shutting down the pump to permit leak detection during periods of pump shutdown.

24. A method of detecting leakage in a wastewater force mains, comprising:
  periodically pumping wastewater through the force mains by means of a pump;
  during a period following pump shutdown while conditions of negative pressure are present in the mains, detecting noise or vibration at a leak location due to fluid being drawn into said mains with spaced sensors located on said mains; and
  analyzing signals from said spaced sensors corresponding to said noise or vibration to determine the location of said leak.

25. A method as claimed in claim 24, wherein said signals are analyzed by cross correlation techniques.

* * * * *